United States Patent
Sugiyama

(10) Patent No.: US 6,700,977 B2
(45) Date of Patent: *Mar. 2, 2004

(54) METHOD AND APPARATUS FOR CANCELLING MULTI-CHANNEL ECHO

(75) Inventor: Akihiko Sugiyama, Tokyo (JP)

(73) Assignee: NEC Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/060,424

(22) Filed: Apr. 14, 1998

(65) Prior Publication Data

US 2002/0101981 A1 Aug. 1, 2002

(30) Foreign Application Priority Data

Apr. 15, 1997 (JP) .............................................. 9-097086
Nov. 7, 1997 (JP) .............................................. 9-320582

(51) Int. Cl.$^7$ ................................................ H04M 9/08
(52) U.S. Cl. .......................... 379/406.08; 379/406.01; 379/406.05; 379/406.06; 379/406.09; 379/406.12; 379/406.02
(58) Field of Search ................................ 379/400–412, 379/406.01–406.16

(56) References Cited

U.S. PATENT DOCUMENTS

| | | | | |
|---|---|---|---|---|
| 5,323,459 A | * | 6/1994 | Hirano ........................ 379/391 |
| 5,396,554 A | * | 3/1995 | Hirano et al. ................ 379/410 |
| 5,412,735 A | * | 5/1995 | Engebretson et al. | |
| 5,841,856 A | * | 11/1998 | Ide .............................. 379/406 |
| 5,856,970 A | * | 1/1999 | Gee et al. .................... 370/286 |
| 5,896,452 A | * | 4/1999 | Yip et al. .................... 379/410 |
| 5,960,077 A | * | 9/1999 | Ishii et al. ................... 379/410 |
| 6,263,015 B1 | * | 7/2001 | Awata et al. | |

OTHER PUBLICATIONS

Joncour et al ; A Unique and Strict Identification of the Echo Path Impulse Response in Sterio Echo Cancellatio: 1996, Technical Report of IEICE DSP96–100 (Dec. 1996); pp. 17–24.*

Yan Joncour et al., "A Stereo Echo Canceler with Correct Echo–Path Identification," The Institute of Electronics, Information and Communication Engineers, Technical Report of IEICE, Apr. 1997, p. 1–7.

(List continued on next page.)

*Primary Examiner*—Forester W. Isen
*Assistant Examiner*—Ramnandan Singh
(74) *Attorney, Agent, or Firm*—Dickstein, Shapiro, Morin & Oshinsky, LLP.

(57) ABSTRACT

Switch 141 continuously switches between received signal 2 and a supplemental signal, which is obtained by processing the received signal 2 through filter 145 to use the output of switch 141 in place of received signal 2. Accordingly, adaptive filters 122 and 124 operate sometimes by using received signal 2 as the input signal and sometimes by using the supplemental signal as the input signal, so that it is possible to obtain adaptive filter coefficients by using twice the number of conditional equations as the case of using only received signal 2 as the input signal. Therefore, since the adaptive filter coefficients do not becomes indefinite, it is possible to converge the coefficients to the correct values. Further, since switching period between the original and the supplemental signals is controlled to be longer than the sampling period of the received signal, it is possible to suppress aliasing distortion of the received signal directly supplied to a speaker and to be maintain better sound quality.

30 Claims, 24 Drawing Sheets

OTHER PUBLICATIONS

Y. Joncour, et al., "A Unique and Strict Identification of the Echo Path Impulse Response in Stereo Echo Cancellation", Technical Report of IEICE, DSP96–100 (Dec. 1996), pp. 17–24.

A. Hirano, et al., "A Compact Multi–Channel Echo Canceller With A Single Adaptive Filter Per Channel", Proceedings of the 1992 IEEE International Symposium on Circuits and Systems, San Diego, CA, May 10–13, 1992, pp. 1922–1925.

M.M. Sondhi, et al., "Stereophonic Acoustic Echo Cancellation—An Overview of the Fundamental Problem", IEEE Signal Processing Letters, vol. 2, No. 8, Aug. 1995, pp. 148–151.

* cited by examiner

EXAMPLE OF THE FILTER CONFIGURATION

SPECIAL EXAMPLE OF THE FILTER CONFIGURATION

EXAMPLE OF THE FILTER CONFIGURATION

SPECIAL EXAMPLE OF THE FILTER CONFIGURATION

EXAMPLE OF THE PRE-PROCESSING CIRCUIT

EQUIVALENT CIRCUIT

METHOD AND APPARATUS FOR CANCELLING MULTI-CHANNEL ECHO

BACKGROUND OF THE INVENTION

The present invention relates to method and apparatus for cancelling an echo in a system having a plurality of received signals and a single or a plurality of transmission signal or signals.

Regarding multi-channel echo cancelling method and apparatus for cancelling an echo occurring by transmission of the received signal through a spatial acoustic path in the system having a plurality of received signals and a single or a plurality of transmission signal or signals, there have been proposed two types of systems, such as a cascade connection type and a linear combination type, in the technical Report of the Institute of Electronics, Information and Communication Engineers (IEICE) of Japan Vol. 84, No. 330, pp. 714, CS-84-714 (hereafter, referred as Reference 1). According to the Reference 1, since the cascade connection type has a restriction of a constitution, an echo suppression performance thereof is inferior to that of the linear combination type. Accordingly, there will be described a case where a linear combination type multi-channel echo cancelling apparatus (an echo canceller) is applied to a two channel system having a pair of both reception and transmission signals.

FIG. 24 shows a linear combination type multi-channel echo canceller. A first received signal 1 is reproduced by a first speaker 3 and is going through a spatial acoustic path to a first microphone 9 so as to generate a first echo 5. A second received signal 2 is reproduced by a second speaker 4 and is going through a spatial acoustic path to the first microphone 9 so as to generate a second echo 6. A first mixed signal 14 is generated by adding the first and second echoes 5 and 6 and a first transmission signal 12 which is inputted to the first microphone 9 corresponding to a voice of a talker 11. As the same manner, the first received signal 1 is reproduced by the first speaker 3 and is going through the spatial acoustic path to a second microphone 10 so as to generate a third echo 7. The second received signal 2 is reproduced by the second speaker 4 and is going through a spatial acoustic path to the second microphone 10 so as to generate a fourth echo 8. A second mixed signal 15 is generated by adding the third and fourth echoes 7 and 8 and a second transmission signal 13 which is inputted to the second microphone 10 corresponding to a voice of the talker 11.

In order to cancel an echo which is mixed in the first mixed signal 14, an echo replica 125 corresponding to the first echo 5 is generated by inputting the first received signal 1 in a first adaptive filter 121, and an echo replica 126 corresponding to the second echo 6 is generated by inputting the second received signal 2 in a second adaptive filter 122. A first subtracter 129 subtracts the echo replicas 125 and 126 respectively corresponding to the first and second echoes 5 and 6 from the first mixed signal 14. The first and second adaptive filters 121 and 122 are controlled such that the first subtracter 129 has the minimum output. An output of the first subtracter 129 is a first output signal 16 of an echo canceller 120.

In order to cancel an echo which is mixed in the second mixed signal 15, an echo replica 127 corresponding to the third echo 7 is generated by inputting the first received signal 1 in a third adaptive filter 123, and an echo replica 128 corresponding to the fourth echo 8 is generated by inputting the second received signal 2 in a fourth adaptive filter 124. A second subtracter 130 subtracts the echo replicas 127 and 128 respectively corresponding to the third and fourth echoes 7 and 8 from the second mixed signal 15. The third and fourth adaptive filters 123 and 124 are controlled such that the second subtracter 130 to has the minimum output. An output of the second subtracter 130 is a second output signal 17 of the echo canceller 120.

In a multi-channel television conference system as one of the main applications of multi-channel echo cancellers, since the voice of a talker is recorded by a plurality of microphones, the received signal recorded by each microphone may be approximated to have an attenuation and a delay corresponding to a distance between the talker and the microphone compared to the other received signal. Accordingly, inter-channel correlation of the received signals becomes high.

It this application, a second received signal 2 which is a delayed version of the first received signal 1, an echo path which can be modeled as an FIR (Filter impulse response) filter and an echo canceller based on linear combination are assumed.

The first and second received signals 1 and 2 at the time n denoted as $x_1(n)$ and $x_2(n)$, and an echo which is mixed in the first mixed signal 14 as $d(n)$. When a time difference between the first and the second received signals is $n_d$ (a natural number) samples, equation (1) can be obtained:

$$X_2(n) = X_1(n - n_d) \qquad (1)$$

For simplicity, it is assumed that the entire spatial acoustic paths from the first and the second speakers 3 and 4 to the first and second microphones 9 and 10 have the same length N for its impulse response. Further, a symbol $h_{1,i}$ denotes an impulse response sample of the acoustic path from the speaker 3 to the microphone 9, and a symbol $h_{2,i}$ denotes an impulse response sample of the acoustic path from the speaker 4 to the microphone 9. Here, i is an integer between 0 and N−1. The echo $d(n)$ which is mixed in the mixed signal 14 can be obtained as a sum of the echoes 5 and 6 according to a equation (2) as follows:

$$d(n) = \sum_{i=0}^{N-1} h_{1,i} x_1(n-i) + \sum_{i=0}^{N-1} h_{2,i} x_2(n-i) \qquad (2)$$

When equation (1) is combined with equation (2) to eliminate $x_2(n)$, equation (3) can be obtained as follows:

$$d(n) = \sum_{i=0}^{nd-1} h_{1,i} x_1(n-i) + \sum_{i=nd}^{N-1} (h_{1,i} + h_{2,i-nd}) x_1(n-i) + \sum_{i=N-nd}^{N-1} h_{2,i} x_1(n - n_d - i) \qquad (3)$$

If the i-th filter coefficient of the adaptive filters 121 and 122 are respectively denoted as $w_{1,i}(n)$ and $w_{2,i}(n)$, the echoe replica $\hat{d}(n)$ (d(n) hat(^) ) which is generated by the adaptive filters 121 and 122, can be obtained by a equation (4) as follows:

$$\hat{d}(n) = \sum_{i=0}^{N-1} w_{1,i}(n) x_1(n-i) + \sum_{i=0}^{N-1} w_{2,i}(n) x_2(n-i) \qquad (4)$$

When the equation (1) combined with equation (4) to eliminate $x_2(n)$, it is possible to obtain equation (5) as follows:

$$\hat{d}(n) = \sum_{i=0}^{nd-1} w_{1,i}(n)x_1(n-i) + \sum_{i=nd}^{N-1} \{w_{1,i}(n) + w_{2,i-nd}(n)\}x_1(n-i) + \qquad (5)$$

$$\sum_{i=N-nd}^{N-1} w_{2,i}(n)x_1(n-n_d-i)$$

A redidual echo e(n) can be obtained by equation (6) as follows:

$$e(n) = \sum_{i=0}^{nd-1} \{h_{1,i} - w_{1,i}(n)\}x_1(n-i) + \qquad (6)$$

$$\sum_{i=nd}^{N-1} \{h_{1,i} + h_{2,i-nd} - w_{1,i}(n) - w_{2,i-nd}(n)\}x_1(n-i) +$$

$$\sum_{i=N-nd}^{N-1} \{h_{2,i} - w_{2,i}(n)\}x_1(n-n_d-i)$$

To completely cancel the echo, the following conditions must be satisfied:

$$\begin{aligned} h_{1,i} &= w_{1,i}(n) & i &= 0, \cdots, n_d - 1 \\ h_{1,i} + h_{2,i-nd} &= w_{1,i}(n) + w_{2,i-nd}(n) & i &= n_d, \cdots, N-1 \\ h_{2,i} &= w_{2,i}(n) & i &= N-n_d, \cdots, N-1 \end{aligned} \qquad (7)$$

According to a equation (7), $$w_{1,0}(n), \ldots, w_{1,nd-1}(n) \text{ and } w_{2,N-nd}(n), \ldots, w_{2,N-1}(n)$$

is uniquely determined, however solutions to $$w_{1,nd}(n), \ldots, w_{1,N-1}(n) \text{ and } w_{2,0}, \ldots, w_{2,N-nd-1}(n)$$

include an infinite number of combinations. Specifically, since solutions to $$W_{1,nd}(n), \ldots, W_{1,N-1}(n) \text{ and } W_{2,0}, \ldots, W_{2,N-nd-1}(n)$$

depend on the value of $n_d$, therefore, when the value of $n_d$ changes with a movement of the talker, the solutions change there with. This means that an echo cancellation capability deteriorates even in a case where the echo path does not change, so as to result in an obstruction in an actual use. As described above, even though the explanation has been performed with respect only to the adaptive filters 121 and 122 used for cancelling an echo mixed in the mixed signal 14, the same explanation may be established with respect to the adaptive filters 123 and 124.

In order to solve this problem, a multi-channel echo cancelling apparatus, in which a single adaptive filter per channel cancels an echo which is generated by the sum of signals propagated from one sound source through plurality of paths by generating echo replicas with adaptive filters corresponding one to one to the mixed signals, is disclosed in IEEE Proceedings of International Conference on Acoustics, Speech and Signal Processing Vol. 2, 1994, p.p. 245–248 (hereafter, referred to as Reference 2).

In the multi-channel echo cancelling apparatus disclosed in Reference 2, the solution does not become indefinite, because each adaptive filter cancels the echo occurring in the corresponding channel. Accordingly, coefficients of the adaptive filters converge to the optimum values that are uniquely defined. However, in the Reference 2, it is described as an evaluation result that the echo cancellation capability deteriorates when parameters determined by the used environment such as the arrangement of the microphones to record the talker voice are not within a certain range. Accordingly, in order to use the cancellation apparatus in a variety of environment, a multi-channel echo canceller based on linear combination must be used.

On the basis of the above premise, a system capable of uniquely identifying coefficients of the adaptive filter has been proposed. This system is a multi-channel echo canceller based on linear combination which generates a delayed signal from the received signal, and utilize this delayed signal as new received signal by periodically alternating it with the original received signal. The system is disclosed in the Technical Report of the Institute of Electronics, and Information and Communication Engineers (IEICE) of Japan (hereafter, referred as Reference 3). In the multi-channel echo cancellation system disclosed in the Reference 3, since a number of equations, which are used for calculating coefficients of the adaptive filters, increases by introducing the delayed received signal, it is does not have a problem of the indefinite number of solutions. Accordingly, the coefficients of the adaptive filter converge to the optimum values which are uniquely determined. However, the Reference 3 also discloses that this system has a problem that switching between the received signal and the delayed received signal causes aliasing, which leads to inferior sound quality.

As has been described so far by using FIG. 24, the conventional multi-channel echo cancellation method and apparatus have the problem that the coefficients of the adaptive filter have an indefinite number of and that the adaptive filter can not reach the solution that is uniquely determined by the impulse response of the echo path. Further, the system that is proposed by the Reference 3 could not avoid deterioration of the sound quality by aliasing. The objective of the present invention is to provide a multi-channel echo cancellation method and apparatus having coefficient values that converge to the true values which are uniquely determined by the impulse response of the echo path, so as to have an excellent sound quality.

SUMMARY OF THE INVENTION

The objective of the present invention is to provide a method and apparatus for cancelling multi-channel echoes, in which coefficient values of the adaptive filter converge to the true values which are uniquely determined by the impulse response of an echo path to achieve excellent sound quality.

A multi-channel echo cancellation method and apparatus according to the present invention first generate a supplemental signal by filtering one of the received signals and second generate a new received signal by switching between over the received signal and the supplemental signal. Further, a cycle of the changeover is set to be longer than the sampling period of the received signal.

In detail, the system has a filter (145 in FIG. 1) for generating a supplemental signal by processing one of the received signals, a switch (141 in FIG. 1) for switching between the input and the output of the filter to generate a new received signal, and a frequency divider (143 in FIG. 1) for generating a change-over timing signal of the switch.

Further, the multi-channel echo cancellation method and apparatus according to the present invention first generate a supplemental signal by filtering one of the received signals and second generate a new received signal by switching between the received signal and the supplemental signal. Further, a cycle of the changeover is set to be longer than the sampling period of the received signal, and the changeover is performed corresponding to the received signal characteristics.

In detail, the system has a filter (145 in FIG. 4) for generating a supplemental signal by processing one of the received signals, a switch (141 in FIG. 4) for switching between input and the output of the filter to generate a new received signal, a frequency divider (143 in FIG. 4) for generating a changeover timing signal of the switch, an analysis circuit (147 in FIG. 4) for analyzing the received signal, and a logical multiplier (146 in FIG. 4) for detecting a coincidence of the changeover timing signal and the timing signal after analyzing the received signal, so that an output of the logical multiplier changes over the switch.

Furthermore, the multi-channel echo cancellation method and apparatus according to the present invention first generate a supplemental signal by filtering one of received signals and second generate a new received signal by switching between the received signal and the supplemental signal. The changeover is performed by a changeover signal that is generated on the basis of the analyzed result of the received signal.

In detail, the system has a filter (145 in FIG. 7) for generating a supplemental signal by filtering one of the received signals, a switch (141 in FIG. 7) for switching between the input and the output of the filter to generate the new received signal, and an analysis circuit (148 in FIG. 7) for generating a changeover signal of the switch under the consideration of a changeover cycle after analyzing the received signal.

The multi-channel echo cancellation method and apparatus according to the present invention generates a supplemental signal after filtering one of the received signals, switching between the original received signal and the supplemental signal, and drives the adaptive filter by the new received signal periodically switching between the signals. Since a plurality of adaptive filters estimate the echo generated by transmission from one signal source through a plurality of paths, it is possible to increase the number of the conditions for obtaining the adaptive filter coefficients, so that there is no problem that the number of solutions becomes indefinite. Accordingly, the coefficients of the adaptive filter converge to the optimum values uniquely determined. Further, since the timing and period of the switching between the original and the supplemental signals are controlled on the basis of the characteristics of the received signals, it is possible to suppress the deterioration of the quality of the received signals that are directly supplied to the speakers and heard by listeners, thereby keeping on excellent sound quality.

A multi-channel echo cancellation apparatus according to the present invention uses a signal processed from one of the received signals as the received signal.

In detail, the apparatus comprises a pre-processing circuit (200 in FIG. 8) for pre-processing the received signal 2 and supplying it to adaptive filters 122 and 124 and digital/analog converter (DAC) 19.

Further, the multi-channel echo cancellation apparatus according to the present invention uses a new received signal, which is generated by processing one of the original received signals, and at the same time, modifies the amplitude of the other received signal.

In detail, the apparatus comprises a pre-processing circuit (300 in FIG. 20) for pre-processing the received signal 2 and supplying it to adaptive filters 122 and 124 and digital/analog converter 19, and an amplitude modification circuit (400 in FIG. 20) for modifying the amplitude of the received signal 1 and for supplying its output signal to adaptive filters 121 and 123 and digital/analog converter 18.

A multi-channel echo cancellation apparatus according to the present invention generates a supplemental signal after filtering one of the received signals, and drives the adaptive filters by the new received signal, which is obtained as a multiplexed signal of the original received signal and the newly generated supplemental signal. Since a plurality of adaptive filters estimate the echo generated by a plurality of transmission paths from one sound source, the number of conditions for obtaining the adaptive filter coefficients increase, so that it is possible to eliminate the problem that the number of solutions becomes indefinite. Accordingly, the coefficients of the adaptive filter converge to the optimum value uniquely defined.

Further, the multi-channel echo cancellation apparatus controls parameters for multiplexing the original received signal and the supplemental signal based on the characteristics of the received signal, and at the same time, offsets a sound image shift caused by the use of the supplemental signal by means of an amplitude modification for the input signal. Accordingly, it is possible to keep excellent sound quality by suppressing quality deterioration of the received signal directly supplied to the speaker for listening.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Embodiments of the present invention will be explained in detail.

In the description, an acoustic echo canceller for cancelling acoustic echoes generated by propagating the received signals from the speakers through the spatial acoustic paths to the microphones in the two-channel case is assumed. This case has the first and the second received signals, and the first and the second mixed signals.

Figure 1:
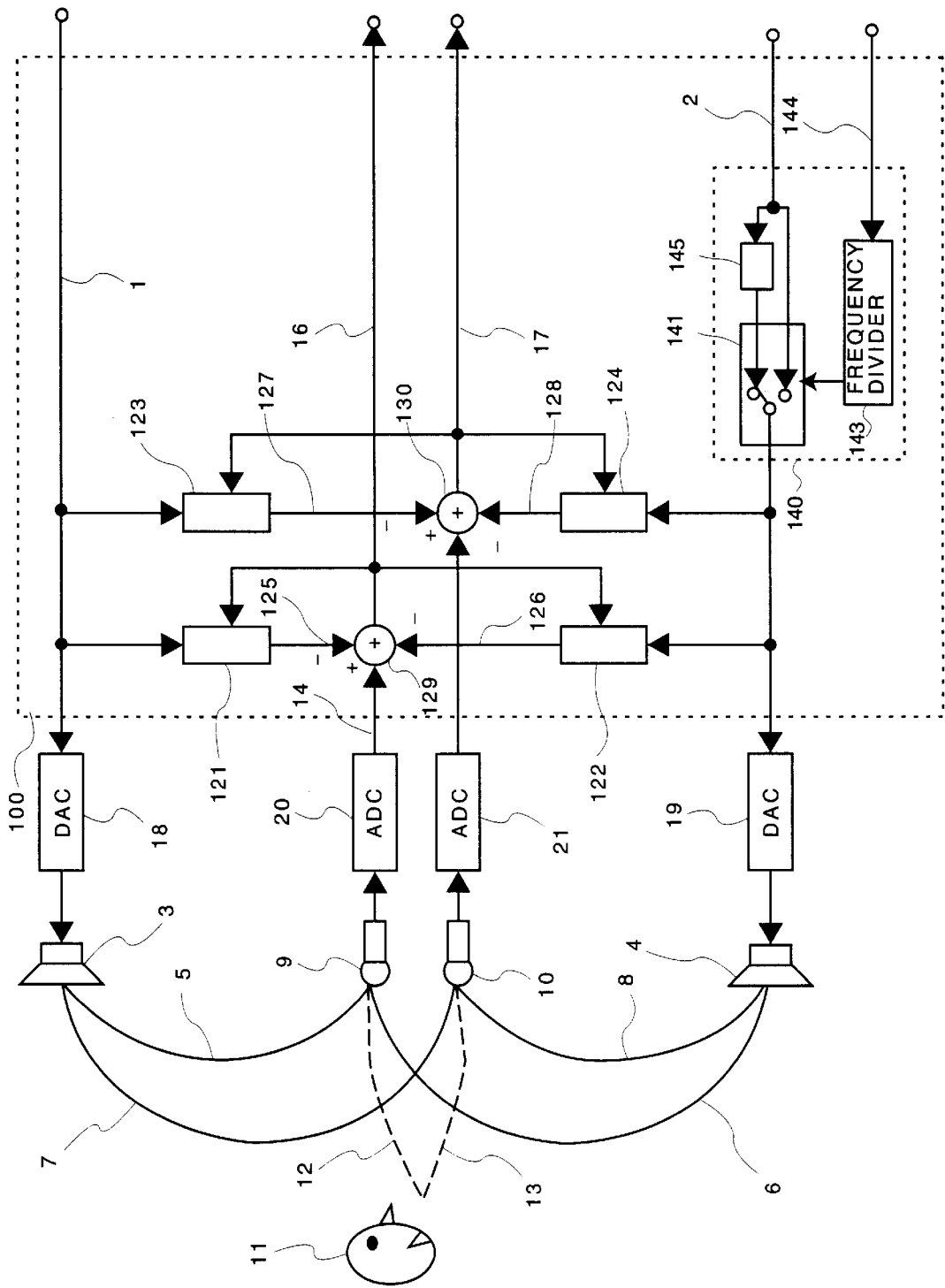
FIG. 1 is a block diagram showing the first embodiment of a multi-channel echo canceller apparatus according to the present invention.

FIG. 1 shows an embodiment of the multi-channel echo canceller according to the present invention where the numbers of the received and transmitted signals are two. The difference between this embodiment and the linear combination type shown in FIG. 24, resides in that received signal 2 supplied to adaptive filters 122 and 124 is pre-processed by a supplemental signal generation circuit 140 to generate a composite or synthetic signal.

Figure 24:
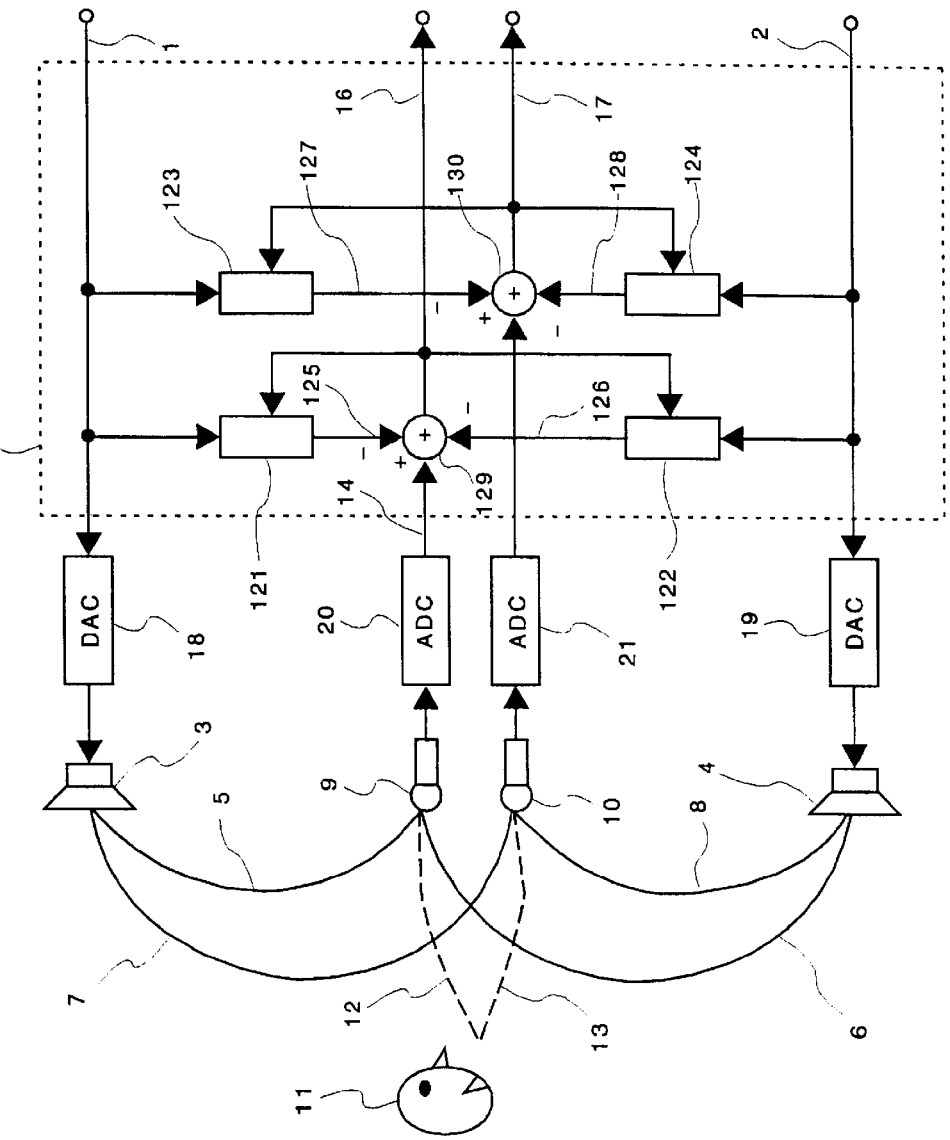
FIG. 24 is a block diagram showing a multi-channel echo canceller based on linear combination apparatus.

The first and the second mixed signals 14 and 15 are generated by the same manner as that of the linear combination type shown in FIG. 24. Received signal 2 is supplied to one of the terminal of switch 141 and filter 145. Filter 145 supplies received signal 2 to the other terminal of switch 141 after filtering. That is, switch 141 has two input terminals, in which one receives received signal 2 as it is, and the other receives its filterd version. A control signal is supplied from frequency divider 143 to switch 141. This control signal is generated by dividing the frequency of clock signal 144 supplied to frequency divider 143. Clock signal 144 comprises rectangular pulses having the same period as the sampling period T of received signal 2. If the frequency divider is supposed to be a 1/M frequency divider that makes the period of the input signal 1/M, frequency divider 143 alternately generates levels of "1" and "0" with a period of MT/2 to supply it to switch 141. The output signal of switch 141 alternates between received signal 2 and the output signal of filter 145 synchronous to a leading edge of the rectangular pulse supplied from frequency divider 143. The composite signal as the output of the switch 141 is supplied to adaptive filters 122 and 124 and digital/analog converter (DAC) 19.

Figure 2A:
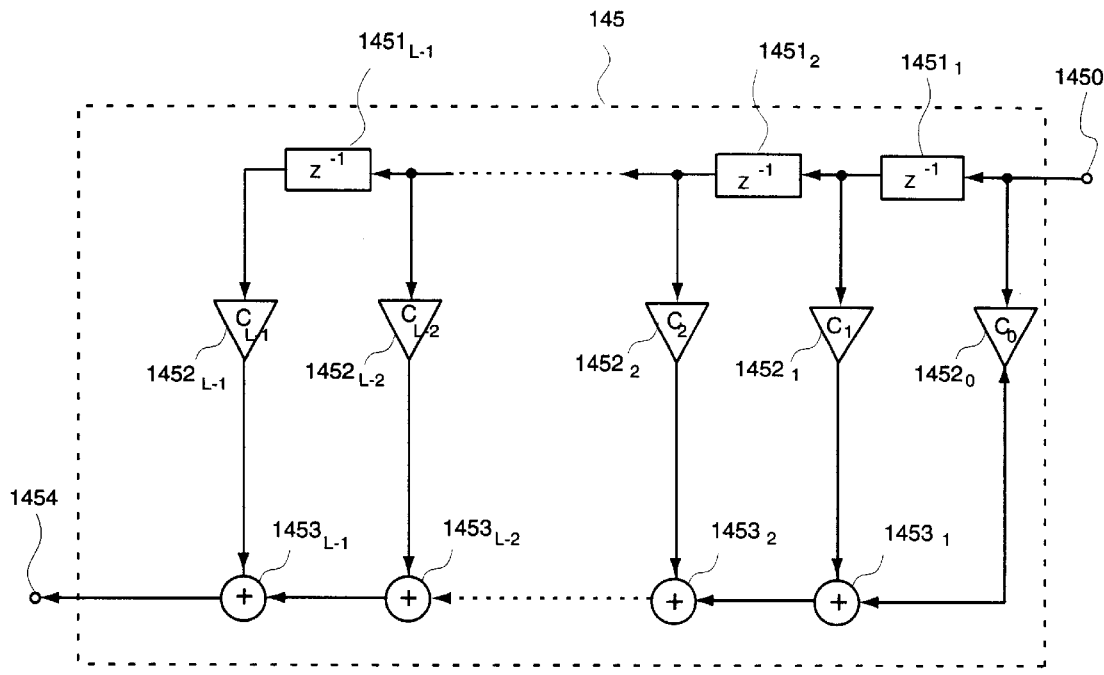
FIG. 2A and FIG. 2B are block diagrams showing examples of the construction of filter 145.
Figure 2B:
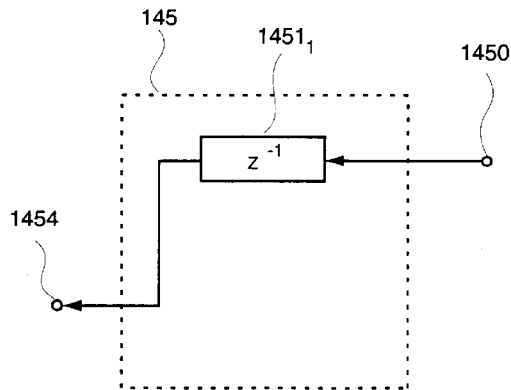

FIG. 2A is a block diagram showing an example of filter 145. Here, even though filter 145 is assumed to be an L-tap FIR filter, other configurations such as an IIR filter may be used. Received signal 2 shown in FIG. 1 is supplied to input terminal 1450 shown in FIG. 2A. The signal obtained at output terminal 1454 in FIG. 2A is supplied to switch 141 in FIG. 1. The signal supplied to input terminal 1450 is transferred to delay element $1451_1$ and coefficient multiplier $1452_0$. Delay elements $1451_1, 1451_2, \ldots, 1451_{L-1}$ are unit delay elements each of which outputs an input signal sample with one sample delay and forms an L-tap tapped delay line by cascade connection. Assuming L=2, $c_o$=0 and $c_1$=1, filter 145 has only delay element 14511 as is shown in FIG. 2B. Further, when M=1, or in other words, frequency divider 143 does not perform frequency division, the system according to this embodiment of the present invention becomes equal to the conventional system disclosed in Reference 3. Reference 3 proves that the coefficients of the adaptive filter are uniquely defined in such a case.

For M>1, it is clear that the number of conditionals for obtaining the adaptive filter coefficient does not change in comparison with a case of M=1. Accordingly, the adaptive filter coefficients are uniquely determined in this case. In a general case usher L=2, $c_0$=0 and $c_1$=1 do not hold, discussion applies. Except the case where the output of filter 145 is equal to the input signal, or in other words L=1 and $c_0$=1, the output of supplemental signal generation circuit 140 is different according to the status of switch 141. Accordingly, the number of conditionals for obtaining the adaptive filter coefficients is equal to that of the case where L=2, $c_0$=0 and $c_1$=1, so that the adaptive filter coefficients are uniquely determined.

Also, it is possible for the present invention to suppress a deterioration of the sound quality caused by aliasing. In order to make further consideration reduction of the quality deterioration, let us investigate the supplemental signal generation circuit shown in FIG. 3A, whose equivalent circuit FIG. 3B.

Figure 3A:
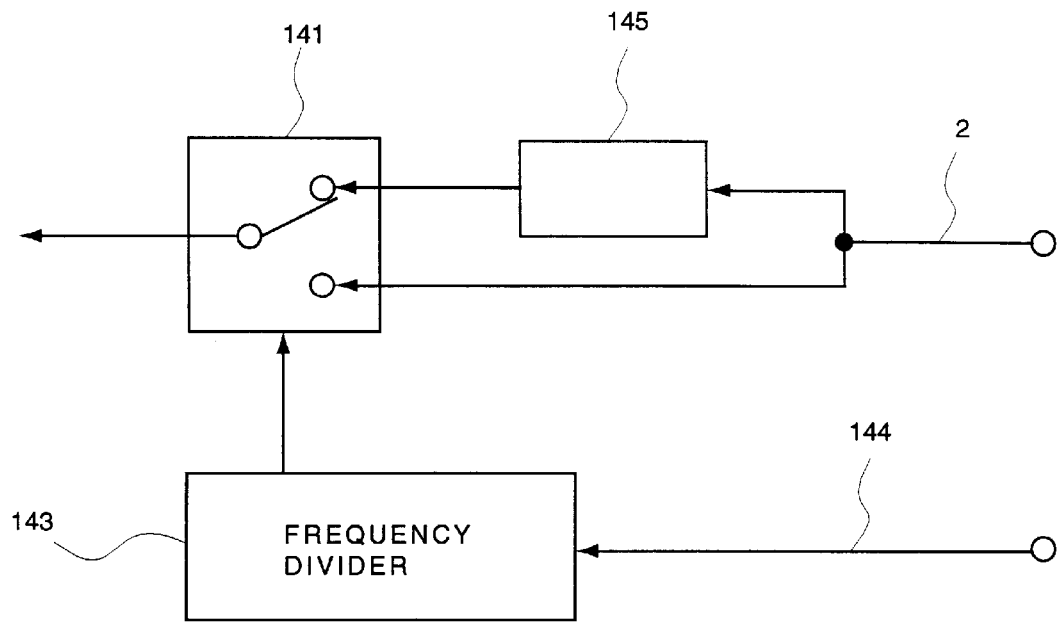
FIG. 3A and FIG. 3B are block diagrams showing an example of the pre-processing circuit for generating a supplemental signal and its equivalent circuit.
Figure 3B:
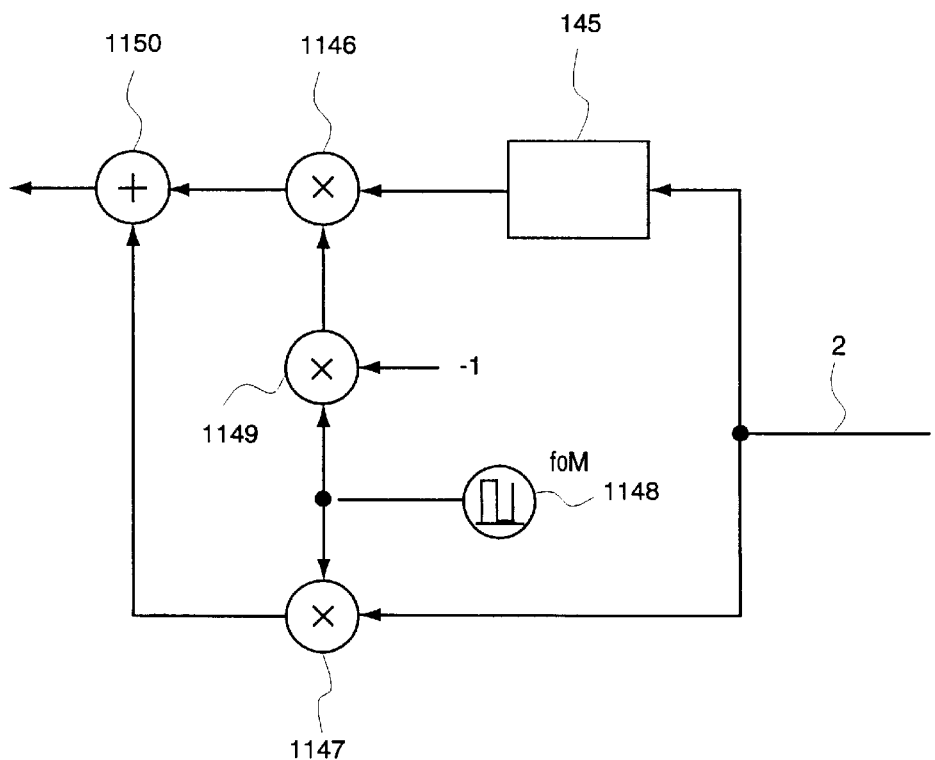

In FIG. 3B, multipliers 1146, 1147 and 1149, rectangular pulse generator 1148 and adder 1150 correspond to switch 141 and frequency divider 143 shown in FIG. 3A. In FIG. 3B, the output signal from filter 145 is transferred to multiplier 1146. Received signal 2 is supplied to filter 145 and multiplier 147. On the other hand, rectangular pulse generator 1148 generates a rectangular pulse having a frequency $f_{0M}$, and supplies it to multipliers 1147 and 1149. Here, $f_0$=1/T is the sampling frequency of received signal 2. The pulse generated by rectangular pulse generator 1148 keeps an amplitude of 1 for a period of $M/2f_0$=MT/2, and an amplitude of 0 for the succeeding $M/2f_0$. The signal supplied from the rectangular pulse generator 1148 is multiplied by −1 with Multiplier 1149 and transferred to multiplier 1146. Accordingly, the I=rectangular pulse supplied to multiplier 1146 has a 180-degree phase difference from that of the rectangular pulse supplied to multiplier 1147. That is, one of the rectangular pulses has amplitude of 1, the other pulse has an amplitude of 0. The output signals of multipliers 1146 and 1147 are both supplied to adder 1150. Since one of these outputs is always zero, it operates as a equivalent by switch. Accordingly, the circuit shown in FIG. 3B is a equivalent to the FIG. 3A. Here, let us investigate a power spectrum of the signal that is a product received signal 2 and the rectangular pulse and is generated in multiplier 1147.

The rectangular pulse supplied to multiplier 1147 has a frequency of $f_0$/M, and it is well known that its power spectrum is obtained by shifting Fourier series of the one cycle pulse supplied from rectangular pulse generator 1148 by $f_0/2M$ and superposing one of the another. Since a detailed derivation is disclosed in "Introduction to digital signal processing technique" issued by OUYOU GIJUTU SYUPPAN (Applied Technology Publisher) 1993 (hereafter, referred to as Reference 4), the detailed description will be omitted. That is, the power spectrum is represented by a convolution of the Fourier series with the delta function.

Further, according to Reference 4, a Fourier transform of a product of the time-domain signals can be represented by a convolution of the Fourier transforms of the respective time-domain signals. Since the convolution with the delta function is equivalent to a shift of the signal to be convoluted to the position of the delta function, the power spectrum obtained as a Fourier transform of the output signal of multiplier 1147 as a product of received signal 2 and a rectangular pulse becomes equal to a superposition of the $f_0/M$-shifted power spectra that is a product of the power spectrum of received signal 2 and the Fourier series. For $M \leq 1$, since the spectrum of received signal 2 is band limited at $f_0/2$, aliasing does not occur. However, for M>1, aliasing occurs according the amount of frequency shift $f_0/M$. According to Reference 4, the Fourier series is represented by a form of the sinc function (sinx/x), and the sidelobe of the amplitude is sharply attenuated for a longer distance from the center. Sharpness of the attenuation depends on the value of M, and the attenuation of the magnitude is sharply increased with the increase of M. In other word, as M becomes longer, the Fourier series approximates the delta function.

Therefore, the power spectrum obtained as a Fourier transform of the output signal of multiplier 1147, can be represented by a product of the power spectrum of received signal 2 and the component of the Fourier series at the zero frequency. Accordingly, aliasing distortion is smaller for larger M, so that the subjective quality of the output signal of multiplier 1147₁₅ improved. Based on the above-mentioned principle, it is possible to suppress the aliasing distortion by a large M.

In the case where M is set large, the output signal of switch 141 has discontinuity by its own switching operation except when M is infinity. This signal discontinuity is subjectively audible by the listener as a noise. The frequency of this noise is inversely proportional to the value of M. It is harder to recognize this noise for a large M compared with a small M, however, it is impossible to make the noise. In the present invention, a proper setting of the characteristics of filter 145 can suppress the subjective noise caused by the signal discontinuity. The following is an example of time-varying coefficients $c_j$ (j=0, 1, . . . , L-1) of filter 145.

In FIG. 2, setting L=2, co is replaced by $C_0(k)$, and $c_1$ is replaced by $c_1(k)$, respectively. According to equations (8)–(11), $c_0(k)$ and $c_1(k)$ are defined as follows:

$$rm_1(k)=\min[rem(k,2M),J] \quad (8)$$

$$c_1(k)=\{rm_1(k)-rm_2(k)\}/J \quad (9)$$

$$rm_2(k)=\max[rem(k+M-1,2M), 2M-J-1]-(2M-J-1) \quad (10)$$

$$c_0(k)=1-c_1(k) \quad (11)$$

Here, rem [A, B] denotes the remainder after dividing A by B, min [C, D] denotes the minimum value of C and D, and max [E, F] denotes the maximum value of E and F. At this time, $c_1(k)$ is represented by a monotonously increasing straight line from 0 to 1 between k=2iM and k=2iM+J(i=0, 1, . . . ) and by a monotonously decreasing straight line from 1 to 0 between k=(2i+1)M−J and k=(2i+1)M(i=0, 1, . . . ).

In addition, $c_0(k)$ is represented by a monotonously decreasing straight line from 1 to 0 between k=2iM and k=2iM+J (i=0, 1, . . . ), and a monotonously increasing straight line from 0 to 1 between k=(2i+1)M−J and k=(2i+1)M(i=0, 1, . . . ). Switch 141 changes its output from received signal 2 to the output of filter 145 at k=2iM, and changes back in the reverse way at k=(2i+1)M. Accordingly, the output of switch 141 is smoothly transferred from received signal 2 to its one-sample delayed version for the j samples immediately before k=(2i+1)M. Further, the output of switch 141 is smoothly transferred to received signal 2 from its one-sample delayed version for j samples after k=2iM. As described above, since no discontinuity in the amplitude of the output signal is generated by switching operation of switch 141, it is possible to suppress the subjectively audible noise by the signal discontinuity. Even though $c_0(k)=0$ and $c_1(k)=1$ for k=(2i+1)M~2(i+1)M(i=0, 1, . . . ), since switch 141 selects and outputs the input signal of filter 145 at this time, these coefficient values have no influence on the entire operation.

As algorithms suitable for implementing adaptive filters 121, 122, 123 and 124, the LMS algorithm and the normalized LMS (NLMS) algorithm are disclosed in "Adaptive Signal Processing", 1985, Prentice-Hall Inc., USA (hereafter, referred to Reference 5), and "Adaptive Filters", 1985, Kulwer Academic Publishers, USA (hereafter, referred to Reference 6). Let us assume that adaptive filters 121 and 122 are implemented by the LMS algorithm, and steps the same size □ are used for adaptive filters 121 and 122. The i-th coefficient $w_{1,i}(n+1)$ of adaptive filter 121 after (n+1)-th adaptation, and the i-th coefficient of $w_{2,i}(n+1)$ of adaptive filter 121 (n+1)-th adaptation are given by equations (12) and (13), using $w1,,(n)$ and $w2,,(n)$, each of which is the corresponding coefficient after n-th adaptation, respectively.

$$w_{1,i}(n+1)=w_{1,i}(n)+\mu_{e1}(n) \times x_i(n-i) \quad (12)$$

$$w_{2,i}(n+1)=w_{2,i}(n)+\mu_{e2}(n) \times x_i(n-nd-i) \quad (13)$$

Adaptive filters 123 and 124 update coefficients in the same manner.

Figure 4:
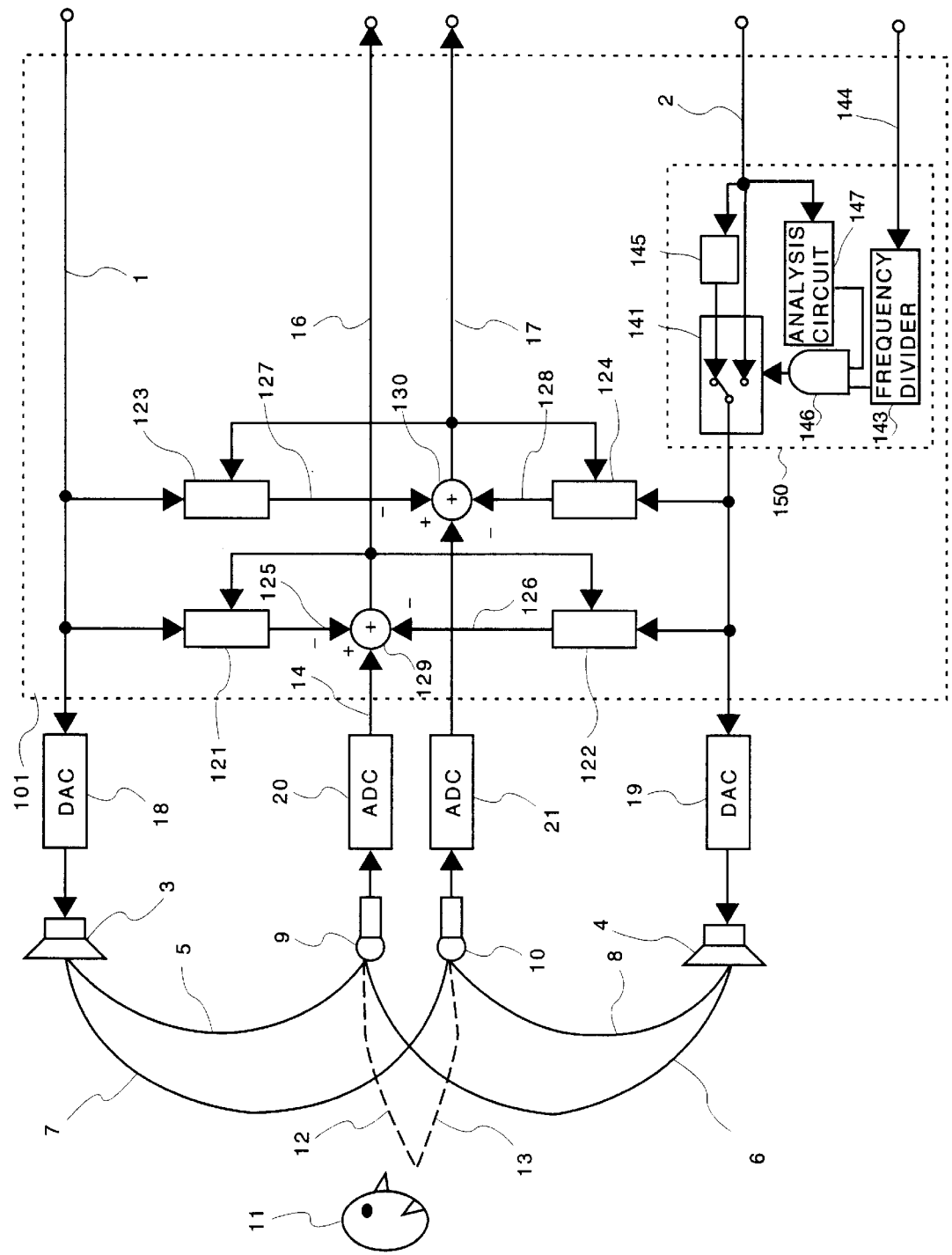
FIG. 4 is a block diagram showing the second embodiment of a multi-channel echo canceller apparatus according to the present invention.

FIG. 4 shows a second embodiment of the present invention. The difference between this and the first embodiment shown in FIG. 1 is to have an analysis circuit 147 and AND circuit 146. Though switch 141 automatically changes its state every M samples in the first embodiment shown in FIG. 1, Switching operation of switch 141 is controlled by a logical product of the output signals of frequency divider 143 and analysis circuit 147 in the second embodiment. Analysis circuit 147 analyzes received signal 2, and transfers "1" AND circuit 146 at a timing suitable for operating switch 141, and "0" at a timing unsuitable for operating switch 141. As has been already described, a control signal "0" or "1" is supplied from frequency divider 143 to AND circuit 146. AND circuit 146 detects that the outputs as timing data from analysis circuit 147 and frequency divider circuit 143 are identical, to a cycle of M samples, and that the analyzed result of the input received signal satisfies the predetermined conditions, thereby controls the switching of switch 141 by the output signal thereof.

Figure 5:
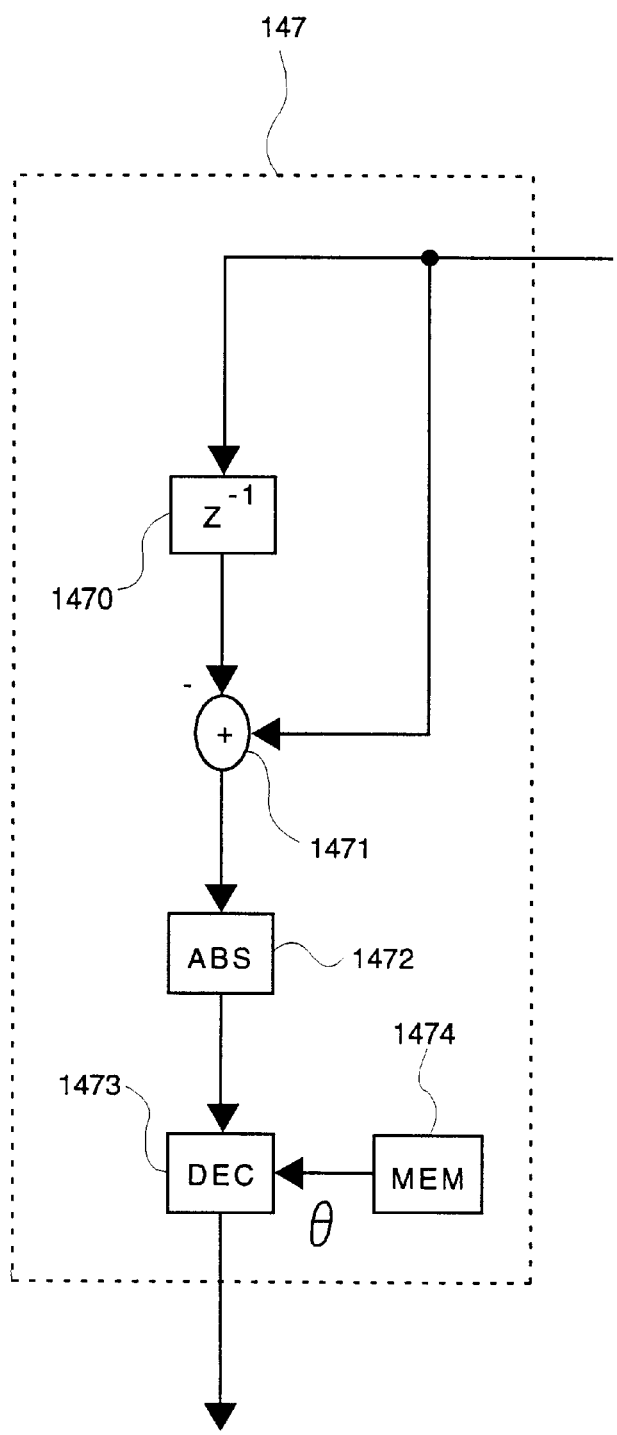
FIG. 5 is a block diagram showing a first example of an analysis circuit 147.

There are a variety of methods for analyzing the received signal by analysis circuit 147. As an example, when the subjective noise by signal discontinuity is to be suppressed, detecting a change in amplitude of received signal 2 performs the analysis. FIG. 5 shows a first example of analysis circuit 147.

Analysis circuit 147 shown in FIG. 5 comprises a delay element 1470, subtracter 1471, absolute value circuit 1472, decision circuit 1473 and memory 1474. Received signal 2 as the input signal to analysis circuit 147 is supplied to delay element 1470 and subtracter 1471. Delay element 1470 delays the input signal by one sample and transfers to subtracter 1471. Subtracter 1471 subtracts the output of delay element 1470 from received signal 2 and supplies the subtracted result to absolute value circuit 1472. Absolute value circuit 1472 takes the absolute value of the supplied signal and transfers to the absolute value to decision circuit 1473. On the other hand, memory 1474 supplies a threshold θ to decision circuit 1473. Decision circuit 1473 is designed to output "1" when the signal supplied from absolute circuit 1472 is less than the threshold θ, and "0" otherwise. The output of decision circuit 1473 is transferred to AND circuit 146 shown in FIG. 4.

Figure 6:
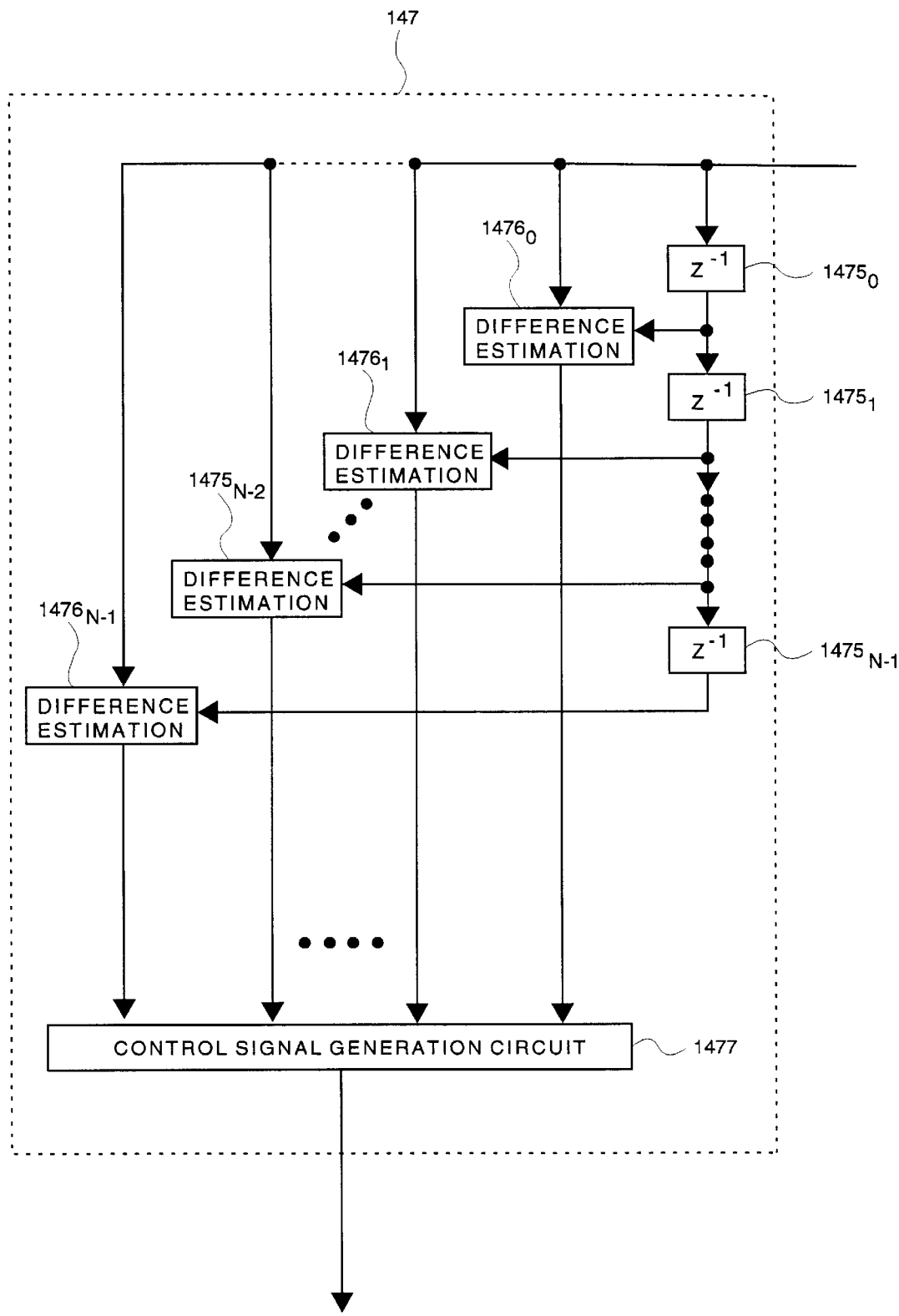
FIG. 6 is a block diagram showing a second example of an analysis circuit 147.

FIG. 6 shows a second example of analysis circuit 147 based on post-masking. Post-masking is a phenomenon that a signal having small amplitude following certain signal sample becomes inaudible, and disclosed in detail in "Psycho acoustics" by E. Zwicker, translated by Yamada and issued from Nishimura Shoten Publisher (hereafter referred to as Reference 7). Analysis circuit 147 shown in FIG. 6 comprises delay elements $1475_0$, $1475_1$, . . . , $1475_{N-1}$, difference estimation circuits $1476_0$, $1476_1$, . . . , $1476_{N-1}$, and control signal generation circuit 1477. Here, N is a positive integer. Received signal 2 is supplied to delay element $1475_0$ and difference estimation circuit $1476_0$. Delay elements $1475_0$, $1475_1$, $1475_{N-1}$ constructs a tapped delay line, each of which delays the respective supplied signal by one sampling.

Difference estimation circuit $1476_0$ estimates the difference between received signal 2 and the signal supplied from delay element $1475_0$, and transfers the result to control signal generation circuit 1477. Estimation of the difference is performed, for example, in the manner that received signal 2 is subtracted from the signal supplied from delay element $1475_0$, and the result is compared to a predetermined threshold δ. Estimation circuit $1476_0$ outputs "1" when the result of subtraction is greater than the threshold δ, and outputs "0" otherwise. Further, estimation circuit $1476_0$ may operate in the manner that the absolute value of received signal 2 is subtracted from the absolute value of the signal supplied from delay element $1475_0$ to output "1" when the result is greater than a predetermined threshold ε0 or "0" otherwise.

In the same manner, each of difference estimation circuits $1476_0$, $1476_1$, . . . , and $1476_{N-1}$ estimates the difference between received signal 2 and the signal supplied from the corresponding delay element, and transfers the estimate to control signal generation circuit 1477. Control signal generation circuit 1477 generates a control signal by using the estimated difference supplied from the difference estimation circuits. Generating the control signal may be performed, for example, by detecting a coincidence of the input signals to the difference estimation circuits. That is, the control circuit outputs "1" when the coincidence is detected, and "0" otherwise. Further, a decision by the majority of the input signals to the difference estimators may be used as the control signal. This signal corresponds to "1" when the majority of the inputs are "1", and "0" otherwise. Furthermore, each of the input signals may be multiplied by a predetermined independent constant corresponding to the input signal, and the sum of each product may be compared with a predetermined threshold. The control circuit may output "1" when the sum is larger than the threshold, and "0" otherwise. Control signal generation circuit 1477, which has already been described, may clearly operate according to the coincidence or the decision by the majority of the said products.

Reference 7 also discloses pre-masking as a phenomenon similar to post-masking. Pre-masking is a phenomenon that a signal sample with a small amplitude becomes inaudible because of making by the following samples. All the samples of the signal must be delayed to detect pre-masking. That is, in the configuration shown in FIG. 4, delay elements are to be inserted into both input paths of switch 141. It is also necessary to adjust the delay by inserting a delay element having a delay corresponding thereto in the path of received signal 1, before adaptive filters 121 and 123. The delay of the delay elements depends on the delay of pre-masking detection. For example, it is necessary to provide delay at least 2-sample for pre-masking detecting by the signal delayed by 2 samples. Further, it is necessary in difference estimation circuits $1476_0$, $1476_1$, . . . , and $1476_{N-1}$ to invert the output thereof. That is, the estimation circuits outputs "0" when the circuit originally should output "1", and outputs "1" otherwise. This inversion makes it possible to detect pre-masking.

In the second embodiment, when the timing signals from the frequency divider 143 and analysis circuit 147 are not equal, switch 141 can not change its state for at least M samples thereafter. Accordingly, the changeover cycle of switch 141 becomes an integer multiple of M. However, it is also possible to provide a configuration of supplemental signal generation circuit 140, in which the changeover cycle of switch 141 is not an integer multiple of M.

Figure 7:
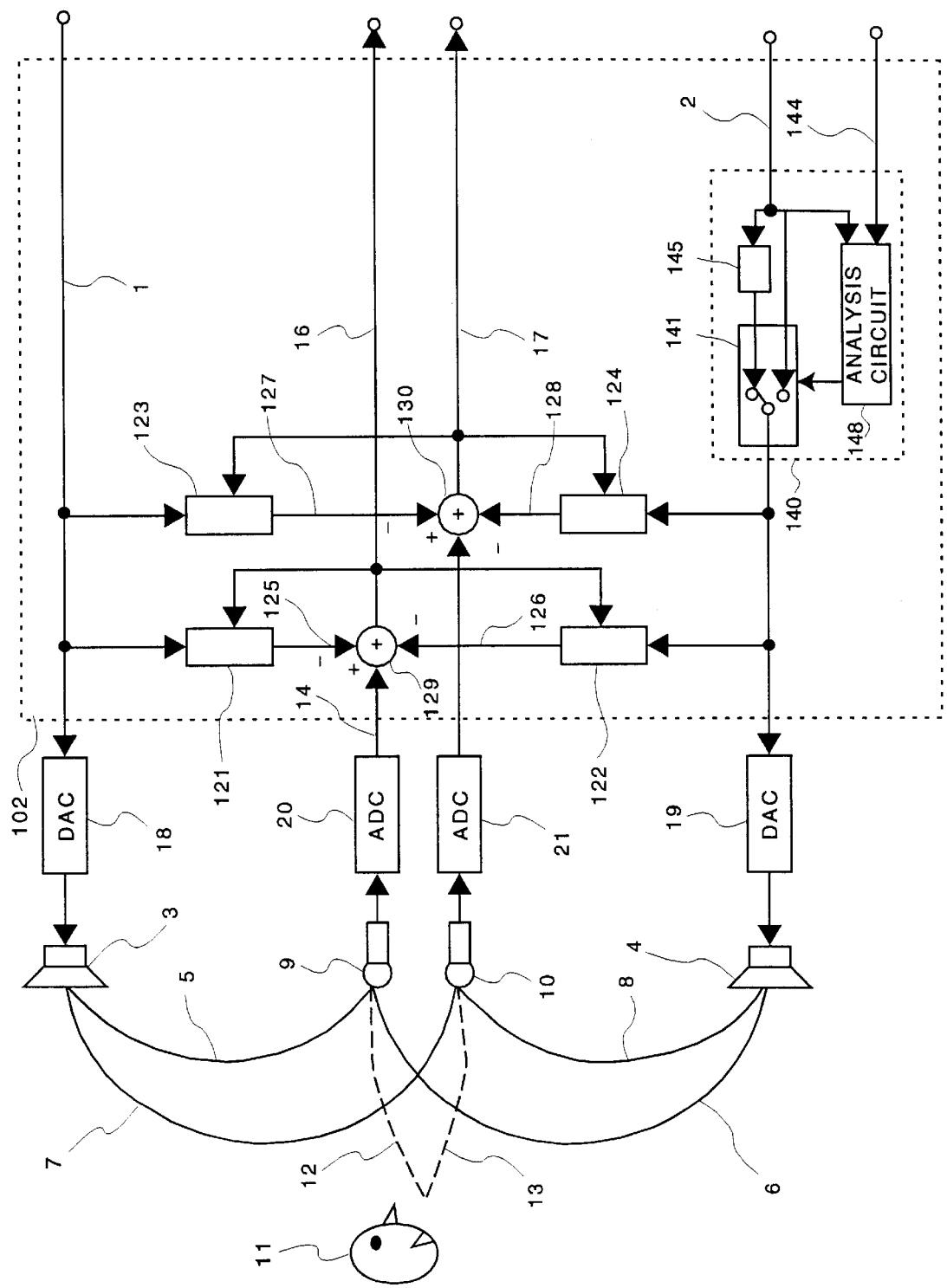
FIG. 7 is a block diagram showing the third embodiment of a multi-channel echo canceller apparatus according to the present invention.

FIG. 7 shows a third embodiment of the present invention. The difference between the third embodiment and the second embodiment shown in FIG. 4, is that the third embodiment has new analysis circuit 148 in place of frequency divider 143, analysis circuit 147 and AND circuit 146. Accordingly, in the second embodiment shown in FIG. 4, switch 141 is controlled by the logical product of the outputs of frequency divider 143 and analysis circuit 147. On the contrary, in the third embodiment shown in FIG. 7, the control signal of the switch 141 is directly generated by analyzing received signal 2 in analysis circuit 148 and combining it with the rectangular pulses supplied to analysis circuit 148.

Analysis circuit 148 analyzes in basically the same manner of the analysis circuit 147. Analysis circuit 148 may detect a change in amplitude of the received signal 2, or may analyze the signal based on pre-/post-masking. After the analysis, analysis circuit 148 outputs a control signal "1" when its analysis means a transition of switch 141 and it is move then a predetermined sampling period (M2T) passes since the previous changeover. Here, symbol M2 is a positive greater than 1. Otherwise, analysis circuit 148 outputs "0". The control signal is transferred to switch 141 to control its own. As a detailed evaluation of the sampling period, a counter counts the number of pulses of rectangular pulses 144, and compares the count with M2 stored in a memory. After the comparison, when these values are equal it is considered M2T to output "1", and at the same time, the counter is reset.

Entire description using FIGS. 1, 4 and 7 relates to the case that supplemental signal generation circuit 140 applies to received signal 2 to generate the supplemental signal. However, it is clear that a similar description with respect to received signal 1 may be provided by applying supplemental signal generation circuit 140 to received signal 1.

Further, even though the above-mentioned several embodiments relate to multi-channel echo cancellation for television conference systems, a similar discussion may be established for single-channel multi-point television conference systems as another application of multi-channel echo cancellation. In a single-channel multi-point television conference system, the talker's voice recorded by one microphone is properly attenuated and delayed so that the acoustic image of the talker is located at a desired position amongst a plurality of speakers used at received side. The same number of such a processed signal is generated as the number of speakers used at the received side. When the number of speakers used at the received side is equal to two, the first and the second received signals 1 and 2 correspond to the two signals which are attenuated and delayed in the said manner in the conventional apparatus shown in FIG. 24. Accordingly, the embodiments of the present invention can apply to the single-channel multi-point case as it is.

Even though the description is done with an example of the case of having the first and the second received signals 1 and 2 and the first and the second mixed signals, the present invention is applicable to the case having a plurality of received signals and a single or a plurality of transmission signal or signals. Further, even though the description is performed with an example that the acoustic echo canceller cancels the acoustic echo which is formed from the received signal radiated from the speaker through the spatial acoustic path the microphone, the present invention is applicable to any other echoes except the acoustic echo, such as an echo occurring by crosstalk.

Furthermore, even though non-recursive adaptive filters with the LMS algorithm have been assumed as the adaptive filters 121, 122, 123, and 124, the present invention is applicable to an arbitrary adaptive filter. For example, non-recursive adaptive filters with the NLMS algorithm are assumed. Coefficient adaptation is performed by equation (14) and (15) as follows:

$$w_{1,i}(n+1) = w_{1,i}(n) + \mu \frac{e_1(n)x_1(n-i)}{\sum_{i=0}^{N-1} x_1^2(n-i)} \quad (14)$$

$$w_{2,i}(n+1) = w_{2,i}(n) + \mu \frac{e_2(n)x_2(n-i)}{\sum_{i=0}^{N-1} x_2^2(n-i)} \quad (15)$$

As an algorithm of the adaptive filter, it possible to use a sequential regression algorithm (SRA) disclosed in Reference 5, and an RLS algorithm disclosed in Reference 6. An adaptive recursive filter may be used in place of the non-recursive adaptive filter. Further, sub-band adaptive filters or transform domain adaptive filters may also be used.

Further, since the present invention controls the changeover timing and cycle of the original signal and supplemental signal on the basis of the characteristics of the received signal that is listened after directly supplied to the speaker, thereby enabling to keep the excellent sound quality.

Next, a fourth embodiment of the present invention will be explained.

In the description, an acoustic echo canceller for cancelling acoustic echoes that generated by propagating the received signals from the speakers through the spatial acoustic paths to the microphones in the two-channel case is assumed. This case has the first and the second received signals, and the first and the second mixed signals.

Figure 8:
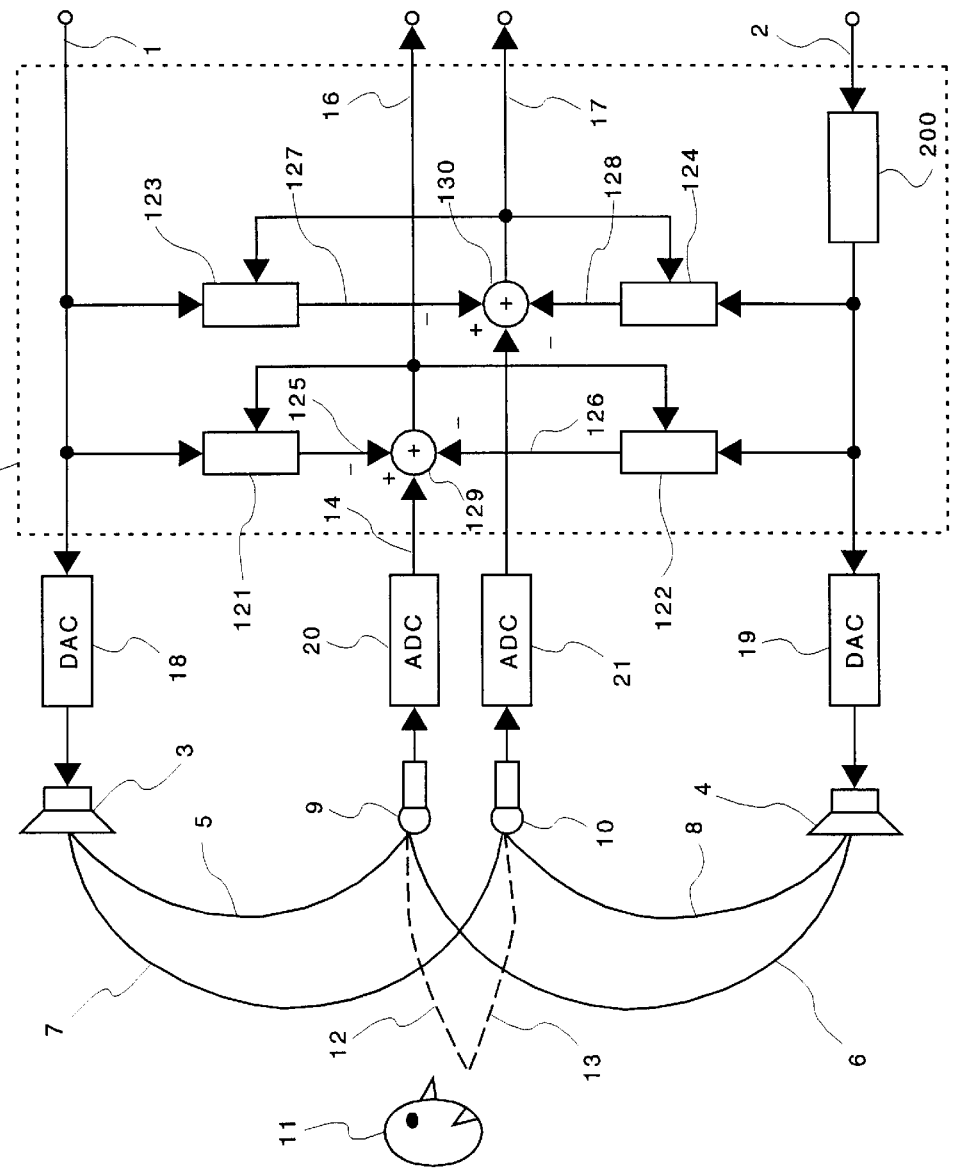
FIG. 8 is a block diagram showing the fourth embodiment of a multi-channel echo canceller apparatus according to the present invention.
Figure 9:
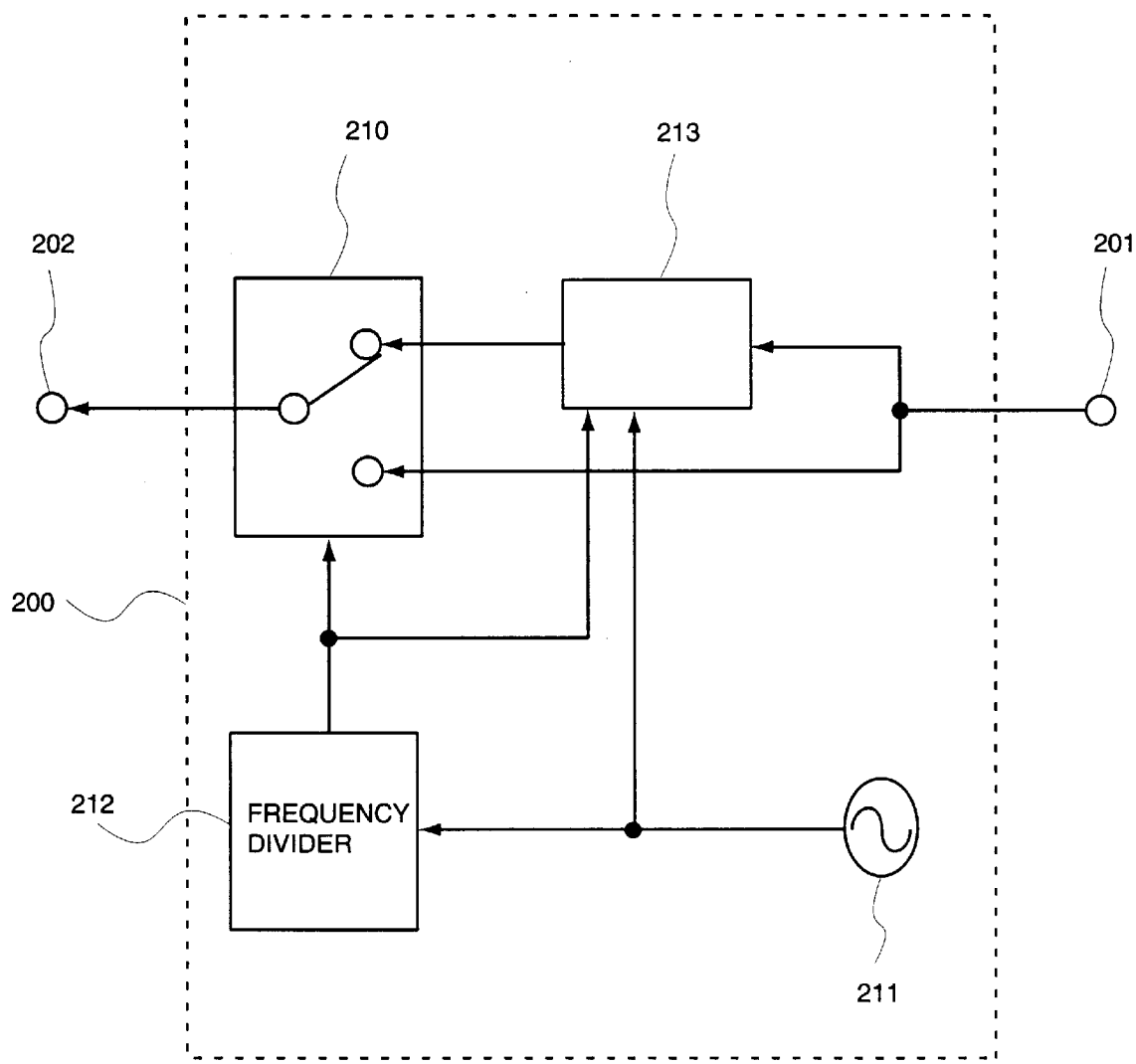
FIG. 9 is a block diagram showing the first example of the pre-processing circuit 200.

FIG. 8 shows an embodiment of the multi-channel echo canceller according to the present invention where two received signals and two transmission signals are used. The difference between this embodiment and the conventional echo canceller based on linear combination shown in FIG. 24 resides in that received signals supplied to adaptive filters 122 and 124 is pre-processed by pre-processing circuit 200. The first and the second mixed signals are generated in the same manner as that of the linear combination type shown in FIG. 24. Received signal 2 is processed by pre-processing circuit 200, which supplies as the output signal a pre-processed signal with adaptive filters 122 and 124 and digital/analog converter (DAC) 19. FIG. 9 is a block diagram showing an example of pre-processing circuit 200. Received signal 2 supplied to input terminal 201 is transferred to filter 213 and one of the input terminals of switch 210. Filter 213 filters received signal 2 and provides the processed signal with the other input terminal of switch 210. That is, two input terminals of the switch 210 receive received signal 2 and the processed signal from filter 213. A frequency divider 212 supplies the control signal to switch 210. Division of the frequency of the clock supplied from clock signal generator 211 results in the control signal. The clock signal comprises rectangular pulses having a cycle equal to the sampling period T of received signal 2.

For convenience of description, from clock signal generator 211 is shown in FIG. 2, however, in general, pre-processing circuit 200 does not have an internal clock signal generation circuit. In such a case, a clock signal common to the entire system is supplied to frequency divider 212 from outside of pre-processing circuit 200. Assuming that frequency divider 212 is a 1/M frequency divider which makes the cycle of the input signal 1/M, frequency divider 212 controls switch 210 by alternatingly outputting "1" and "0" with a cycle of MT/2. Switch 210 is synchronized with a leading edge of the rectangular pulse supplied from frequency divider 212 to switch between received signal 2 and the output signal of filter 213 and transfer its output to terminal 202. The pre-processed signal, by the above-mentioned procedure, is outputted from output terminal 202 as the pre-processed signal.

Figure 10A:
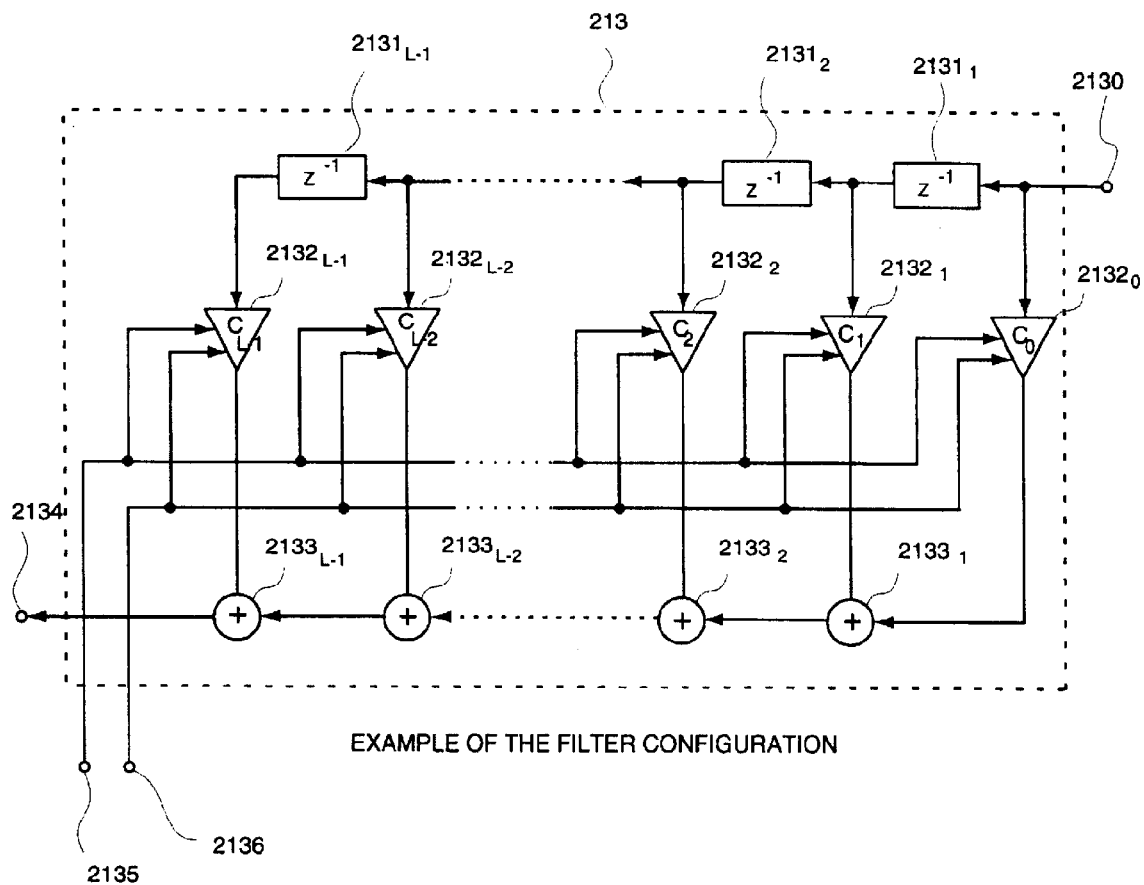
FIG. 10A and FIG. 10B are block diagrams showing examples of filter 213.
Figure 10B:
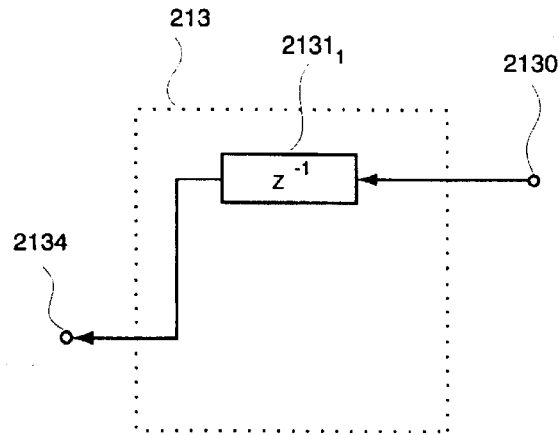

FIG. 10A is a block diagram showing an example configuration of filter 213. Here, even though filter 213 is assumed an L-tap FIR filter, other configurations such as an IIR filter may be used. Received signal 2 shown in FIG. 8 is supplied to input terminal 2130 shown in FIG. 10A. A signal obtained at output terminal 2134 shown in FIG. 10A is supplied to switch 210 shown in FIG. 9. The signal supplied to input terminal 2130 is transferred to a delay element $2131_1$ and a coefficient multiplier $2132_0$. Delay elements $2131_1, 2131_2, \ldots 2131_{L-1}$ are unit delay elements each of which outputs an input signal sample with one sample delay and forms an L-tap tapped delay line by cascade connection. Assuming L=2, c0=0 and c1=1, filter 213 has only delay element 21311 as is shown in FIG. 10B. Further, when M=1, or in otherwise, frequency divider 212 shown in FIG. 8 does not perform frequency division, the configuration shown in FIG. 10B of the present invention becomes equal to the conventional system disclosed in Reference 3. Reference 3 analytically discloses that the coefficients of the adaptive filter are uniquely determined in such a case.

For M>1, it is clear that the number of conditions for obtaining the adaptive filter coefficients does not change in comparison with a case of M=1. Accordingly, the adaptive filter coefficients are uniquely determined in this case. In a general case where by L=2, c0=0 and c1=1 do not hold, the same discussion applies. Except the case where the output of filter 213 is equal to the input signal, or in other words L=1 and c0=1, the output of pre-processing circuit 200 is different according to the state of switch 210. Accordingly, the number of conditions for obtaining the adaptive filter coefficients is equal to that of the case where L=2, $c_0=0$ and $c_1=1$, so that the adaptive filter coefficients are uniquely determined.

Also, it is possible for the present invention to suppress a deterioration of the sound quality caused by aliasing. In order to make further consideration on reduction of the quality deterioration, let us investigate an equivalent circuit shown in FIG. 11B of pre-processing circuit 200 shown in FIG. 11A.

Figure 11A:
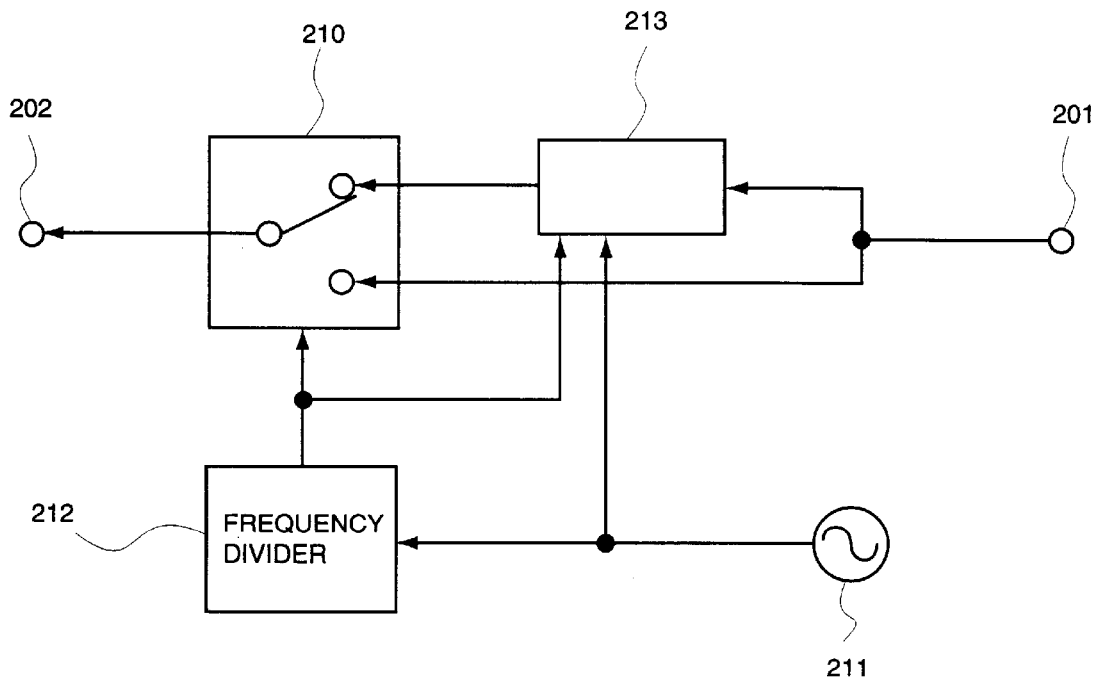
FIG. 11A and FIG. 11B are block diagrams showing an equivalent circuit of the pre-processing circuit 200.
Figure 11B:
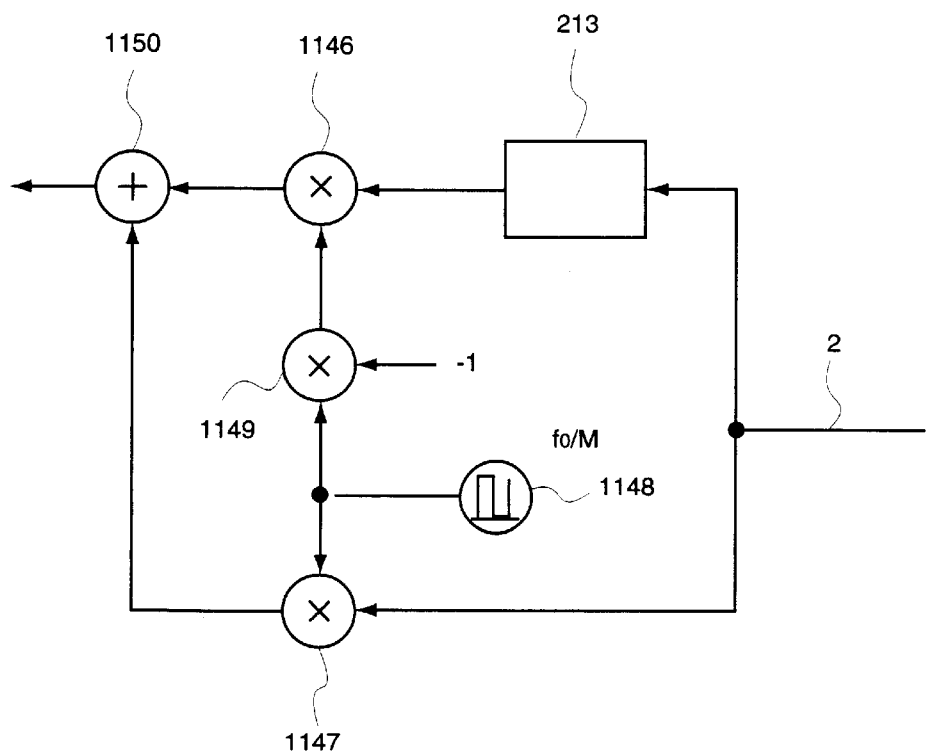

In FIG. 11B, multipliers 1146, 1147 and 1149, rectangular pulse generator 1148 and adder 1150 correspond to switch 210, clock generator circuit 211, and frequency divider 212 shown in FIG. 11A. In FIG. 11B, received signal 2 is supplied to filter 213 and multiplier 1147.

The output signal from filter 213 is transferred to multiplier 1146. On the other hand, rectangular pulse generator 1148 generates a rectangular pulse having a frequency $f_0/M$, and supplies it to multipliers 1147 and 1149. Here, $f_0=1/T$ is the sampling frequency of received signal 2. The pulse generated by rectangular pulse generator 1148 keeps an amplitude of 1 for a period of $M/2f_0=MT/2$, and an amplitude of 0 for the succeeding $M/2f_0$. The signal supplied from rectangular pulse generator 1148 is multiplied by −1 in multiplier 1149 and transferred multiplier 1146. Accordingly, the rectangular pulse supplied to multiplier 1146 has a 180-degree phase difference from that of the rectangular pulse supplied to multiplier 1147. That is, one of the rectangular pulses has an amplitude of 1, the other pulse has an amplitude of 0. The output signals of multipliers 1146 and 1147 are both supplied to adder 1150. Since one of these outputs is always zero, it equivalently operates as a switch. Accordingly, the circuit shown in FIG. 11B is equivalent to FIG. 11A. Here, let us investigate a power spectrum of the signal that is a product of received signal 2 and the rectangular pulse and is generated in multiplier 1147.

The rectangular pulse supplied to multiplier 1147 has a frequency of $f_0/M$, and it is well known that its power spectrum is obtained by shifting the Fourier series of the one cycle pulse supplied from rectangular pulse generator 1148 to by $f_0/M$ and superposing one of the another. Since a detailed derivation is disclosed in Reference 4, further description will be omitted. That is, the power spectrum is represented by a convolution of the Fourier series with the delta function. Further, according to Reference 4, a Fourier transform of a product of the time-domain signals can be represented by a convolution of the Fourier transforms of the respective time-domain signals. Since the convolution with the delta function is equivalent to a shaft of the signal to be convoluted to the position of the delta function, the power spectrum obtained as a Fourier transform of the output signal of multiplier 1147 as a product of received signal 2 and a rectangular pulse becomes equal to a super position of the $f_0/M$-shifted power spectra that is a product of the power spectrum of received signal 2 and the Fourier series. For M□1, since the spectrum of received signal 2 is bandlimited at $f_0/2$, aliasing does not occur.

However, when there is M>1, aliasing occurs according to the amount of frequency shift $f_0/M$. According to Reference 4, the Fourier series is represented by a form of the sinc function (sinx=x), and the sidelobe of the amplitude is sharply attenuated for a longer distance from the center. Sharpness of the attenuation depends on the value of M, and the attenuation of the magnitude is sharply increased with the increase of M. In other words, as M becomes longer, the Fourier series approximates the delta function. Therefore, the power spectrum obtained as a Fourier transform of the output signal of multiplier 1147, can be represented by a product of the power spectrum of received signal 2 and the component of the Fourier series at the zero frequency. Accordingly, aliasing distortion is smaller for a larger M, so that the subjective quality of the output signal of multiplier 147 improved. Based on the above-mentioned principle, it is possible to suppress the aliasing distortion by a large M.

In the case where M is set large, the output signal of switch 210 has discontinuity by its own switching operation except when M is infinity. This signal discontinuity is subjectively audible by the listener as a noise. The frequency of this noise is inverse by proportional to the value of M. It is harder to recognize this noise for a large M in compared with a small M, however, it is impossible to make the noise inaudible. In the present invention, a proper setting of the characteristics of filter 213 helps suppress the subjective noise caused by the signal discontinuity. The following is an example of time-varying coefficients $c_j$ (j=0, 1, . . . , L−1) of filter.

In FIG. 10, setting L=2, $c_0$ is replaced by $c_0(k)$, and $c_1$ is replaced by $c_1(k)$, respectively. According to equations (8)–(11), $c_0(k)$ and $c_1(k)$ are defined as follows:

$$rm_1(k)=\min[\text{rem}(k,2M),J] \tag{16}$$

$$c_1(k)=\{rm_1(k)-rm_2(k)\}/J \tag{17}$$

$$rm_2(k)=\max[\text{rem}(k+M-1,2M), 2M-J-1]-(2M-J-1) \tag{18}$$

$$c_0(k)=1-c_1(k) \tag{19}$$

Here, rem [A, B] denotes the remainder after dividing A by B, min [C, D] denotes the minimum value of C and D, and max [E, F] denotes the maximum value of E and F. At this time, $c_1(k)$ is represented by a monotonously increasing straight line from 0 to 1 between k=2iM and k=2iM+J(i=0, 1,), and by a monotonously decreasing straight line from 1 to 0 between k=(2i+1)M−J and k=(2i+1)M(i=0, 1,). In addition, $c_0(k)$ is represented by a monotonously decreasing straight line from 1 to 0 between k=2iM and k=2iM+J(i=0, 1,), and by a monotonously increasing straight line from 0 to 1 between k=(2i+1)M−J and k=(2i+1)M(i=0, 1,). Switch 210 changes its output from received signal 2 to the output of filter 213 at k=2iM, and changes back in the reverse way at k=(2i+1)M. Accordingly, the output of switch 210 is smoothly transferred from received signal 2 to its one-sample delayed version for the j samples immediately before k=(2i+1)M. Further, the output of switch 210 is smoothly transferred to received signal 2 from its one-sample delayed version for j samples after k=2iM. As described above, since no discontinuity in the amplitude of the output signal is generated by switching operation of switch 210, it is possible to suppress the subjectivly noise by the signal discontinuity. Even though $c_0(k)=0$ and $c_1(k)=1$ for k=(2i+1)M∼2(i+1)M(i=0, 1,), since switch 210 selects and outputs the input signal to filter 213 at this time, these coefficient values have no influence on the entire operation.

As coefficient adaptation algorithms for adaptive filters 121, 122, 123 and 124, the LMS algorithm and the normalized LMS (NLMS) algorithm are disclosed in "adaptive signal processing", 1985, Prentice-Hall Inc., USA, pp99–113 (Reference 5), and "adaptive filter", 1985, Kulwer Academic Publishers, USA, pp 49–56 (Reference 6). Let us assume that adaptive filters 121 and 122 are adapted by the LMS algorithm, and the same step size are used for adaptive filters 121 and 122. The i-th coefficient $w_{1,i}(n+1)$ of adaptive filter 121 after (n+1)-th adaptation, and the i-th coefficient $w_{2,i}(n+1)$ of adaptive filter 122 after (n+1) th adaptation are given by equations (12) and (13) using $w_{1,i}(n)$ and $w_{2,i}(n)$, each of which is the corresponding coefficient after n-th adaptation, respectively.

Adaptive filters 123 and 124 updates coefficients in the same manner.

$$w_{1,i}(n+1)=w_{1,i}(n)+e_1(n)\times x(n-i) \quad (20)$$

$$w_{2,i}(n+1)=w_{2,i}(n)+e_2(n)\times x(n-n_d-i) \quad (21)$$

Figure 12:
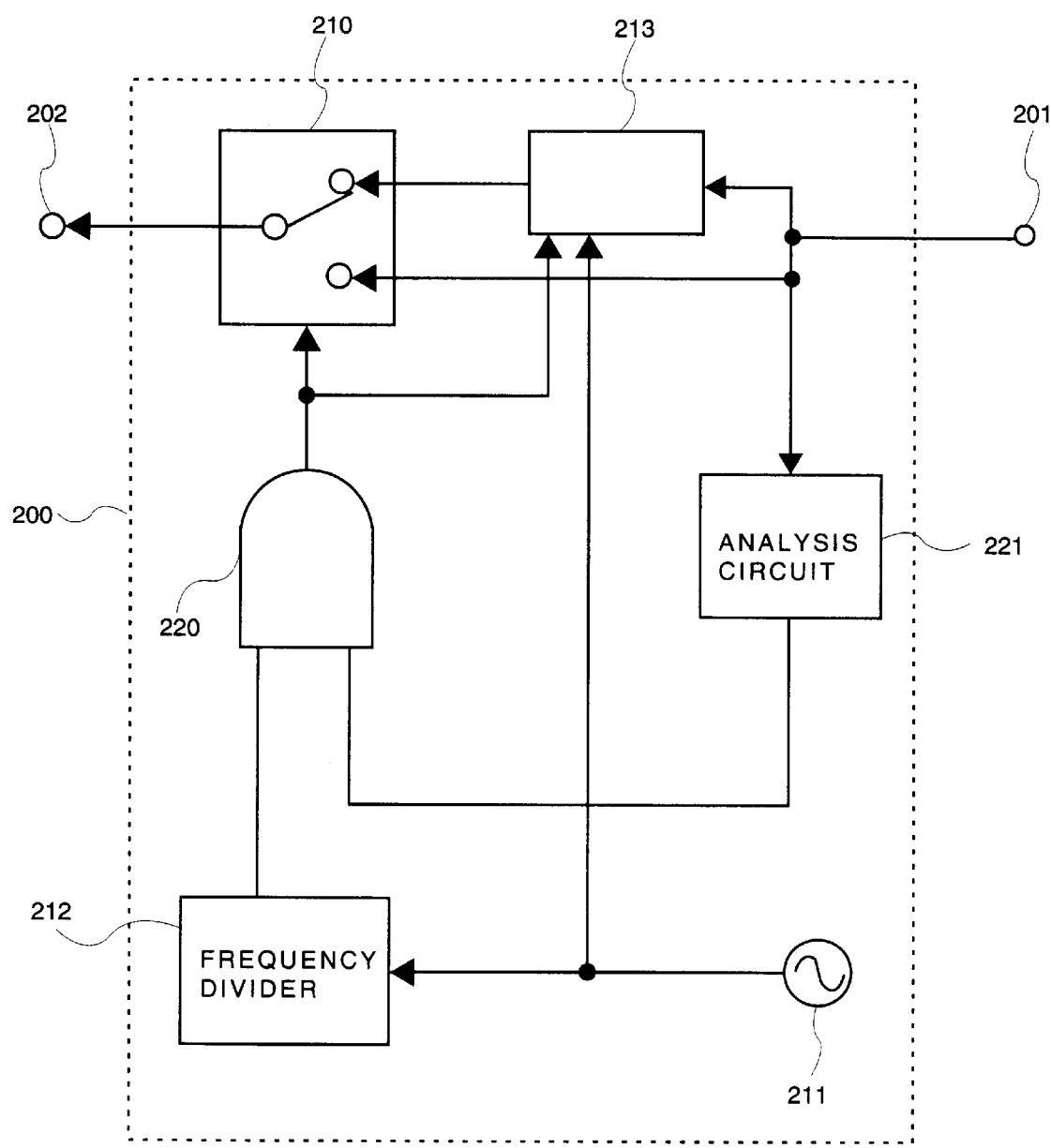
FIG. 12 is a block diagram showing the second example of the pre-processing circuit 200.

FIG. 12 shows a second example of pre-processing circuit 200. The difference between this and the first example shown in FIG. 9 is to have analysis circuit 221 and AND circuit 220 in addition to frequency divider 212. Though switch 210 automatically changes its state every M samples in the first example shown in FIG. 9, switching operation switch 210 is controlled by a logical product of the output signals of frequency divider 212 and analysis circuit 221 in the second example shown in FIG. 12. Analysis circuit 221 analyzes received signal 2, and transfers "1" to AND circuit 220 when the analyzed result satisfies the predetermined condition, and "0" otherwise. As has been already described, a control signal "0" or "1" is supplied from frequency divider 212 to AND circuit 220. AND circuit 220 detects that the outputs as timing data from analysis circuit 221 and frequency divider 212, are identical to a cycle of M samples, and that the analyzed result of the input received signal satisfies the predetermined conditions, thereby controls the changeover of switch 210 by the output signal thereof.

Figure 13:
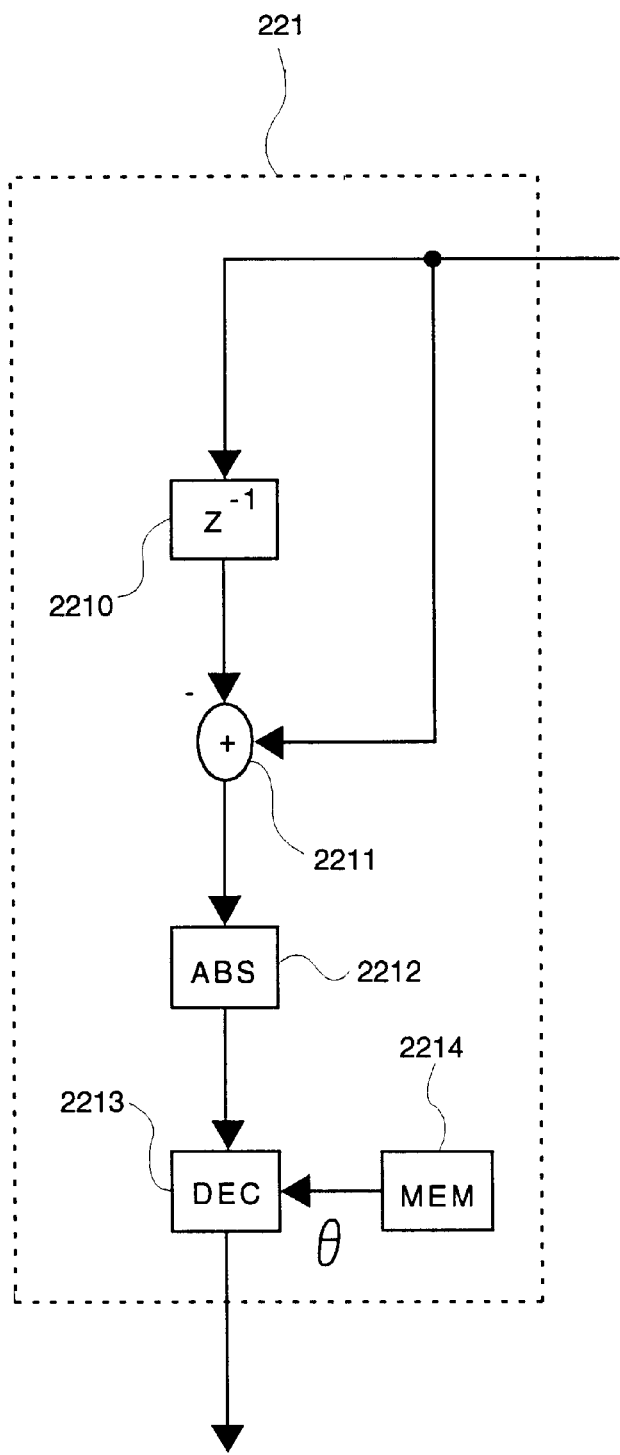
FIG. 13 is a block diagram showing a first example of an analysis circuit 221.

There are a variety of methods for analyzing the received signal by analysis circuit 221. As an example, when the subjective noise by signal discontinuity is to be suppressed, detecting a change in amplitude of received signal 2 performs the analysis. FIG. 13 shows a first example of analysis circuit 221.

Analysis circuit 221 shown in FIG. 13 comprises a delay element 2210, subtracter 2211, absolute value circuit 2212, decision circuit 2213 and memory 1474. Received signal 2 as the input signal to analysis circuit 221 is supplied to delay element 2210 and subtracter 2211. Delay element 2210 delays the input signal by one sample to and transfers to subtracter 2211. Subtracter 2211 subtracts the output of delay element 2210 from received signal 2 and supplies the subtracted result to absolute value circuit 2212. Absolute value circuit 2212 takes the absolute value of the supplied signal and transfers the absolute value to decision circuit 2213.

On the other hand, memory 2214 supplies a threshold θ to decision circuit 2213. Decision circuit 2213 is designed to outputting "1" when the signal supplied from absolute circuit 2212 is less than the threshold θ, and "0" otherwise. The output of decision circuit 2213 is transferred to AND circuit 220 shown in FIG. 5.

Figure 14:
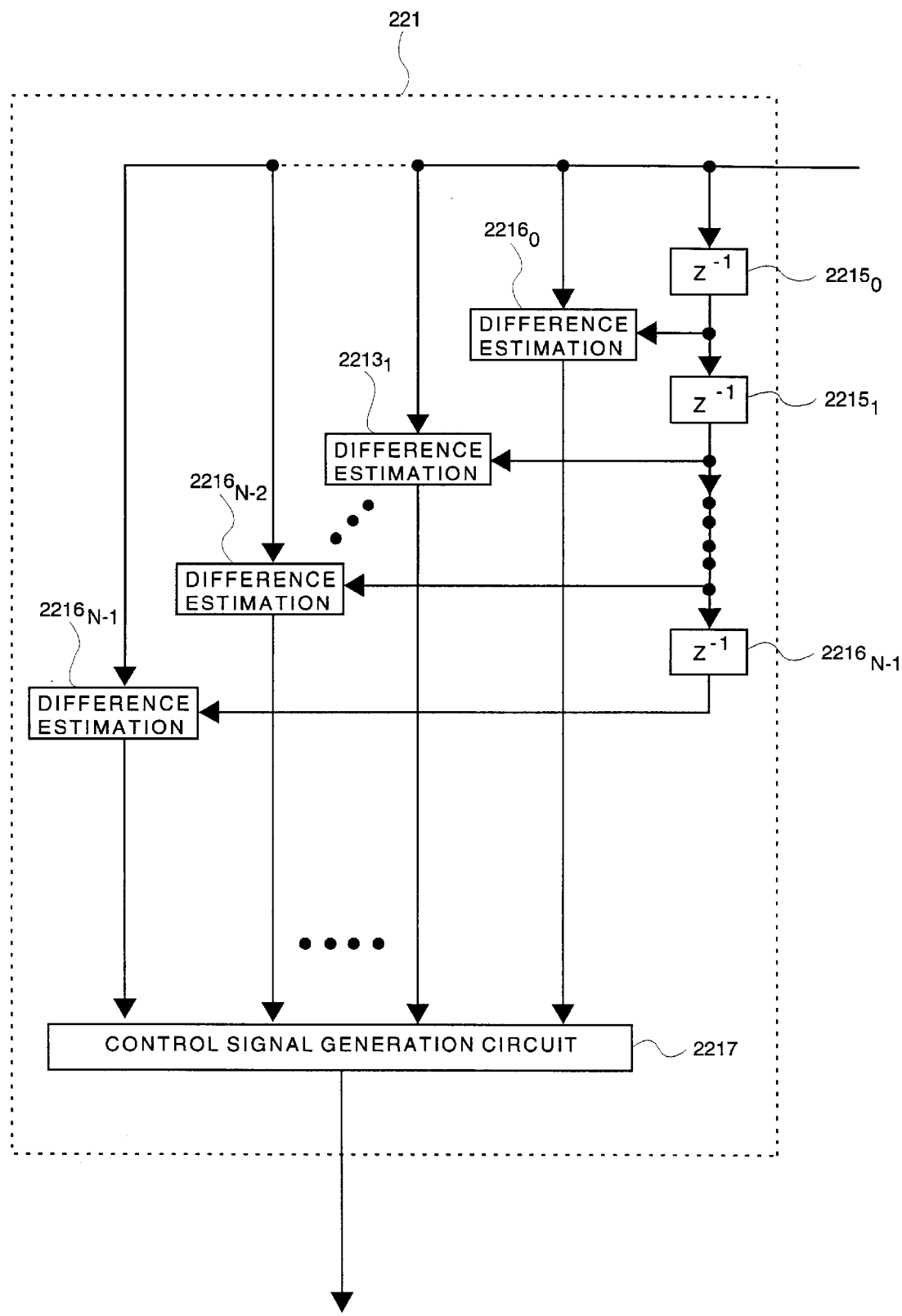
FIG. 14 is a block diagram showing a second example of an analysis circuit 221.

FIG. 14 shows a second example of analysis circuit 221 based on post-masking. Post-masking is a phenomenon that a signal having a small amplitude following a certain signal sample becomes inaudible, and disclosed in detail in "Psychoacoustics" by Zwicker, translated by Yamada and issued from Nishimura Shoten Publisher, 1992, pp132–146 (Reference 7). Analysis circuit 221 shown in FIG. 14 comprises delay elements $2215_0$, $2215_1$, $2215_{N-1}$, difference estimation circuits $2216_0$, $2216_1$, $2216_{N-1}$, and control signal generation circuit 2217. Here, N is a positive integer. Received signal 2 is supplied to delay element $2215_0$ and difference estimation circuit $2216_0$. Each of the delay elements $2215_0$, $2215_1$, ..., $2215_{N-1}$ constructs a tapped delay line, each of which delays the respective supplied signal by one sample.

Difference estimation circuit $2216_0$ estimates the difference between received signal 2 and the signal supplied from delay element $2215_0$, and transfers the result to control signal generator 2217. Estimation of the difference is performed, for example, in the manner that received signal 2 is subtracted from the signal supplied from delay element $2215_0$, and result is compared to a predetermined threshold. "1" is outputted when the estimate is greater than the threshold $\delta_0$, and "0" is outputted otherwise. Further, estimation circuit 22160 may operate in the manner that the absolute value of received signal 2 is subtracted from the absolute value of the signal supplied from delay element $2215_0$ to output "1" when the result is than a predetermined threshold $C_\Sigma$ or "0" otherwise.

In the same manner, each of difference estimation circuits $2216_0$, $2216_1$, and $2216_{N-1}$ estimates the difference between received signal 2 and the signal supplied from the corresponding delay element, and transfers the estimate to control signal generator 2217. Control signal generator 2217 generates a control signal by using the estimated difference supplied from the difference estimation circuits. Generating the control signal may be performed, for example, by deleting a coincidence of the input signals to the difference estimation circuits. That is, the control circuit outputs "1" when the coincidence is detected, and "0" otherwise. Further, a decision by the majority of the input signals of the difference estimator may be the control signal. This signal corresponds to "1" when majority of the inputs are "1", and "0" otherwise. Furthermore, each of the input signals may be multiplied a predetermined independent constant corresponding to the input signal, and the sum of each product may be compared with a predetermined threshold. The control circuit may output "1" when the sum is larger than the threshold, and "0" otherwise. Control signal generator 2217, which has already been described, may clearly operate according to the coincidence or the decision by the majority of the said product. According to the above processing, when the amplitude of received signal 2 decreases compared with previous samples, of switch 210 is changed. Reference 7 also discloses pre-masking as a phenomenon similar to post-masking. Pre-masking is a phenomenon that a signal sample with a small amplitude becomes inaudible because of masking by the following samples.

All the samples of the signal must be delayed to detect pre-masking. That is, in the configuration shown in FIG. 12, delay elements are to be inserted into both input paths of switch 210. It is also necessary to adjust the delay by inserting a delay element having a delay corresponding thereto in the path of received signal 1, which before adaptive filters 121 and 123. The delay of the delay elements depends on the delay of pre-masking detection. For example, it is necessary to provide at least 2-sample delay for detecting pre-masking by the signal delayed by 2 samples. Further, it is necessary in difference estimation circuits $2216_0$, $2216_1$, ..., and $2216_{N-1}$ shown in FIG. 14 to invert the output thereof. That is, the estimation circuits outputs "0" when the circuit originally should output "1", and outputs "1" otherwise. This inversion makes it possible detect pre-masking. According to the above-mentioned processing, immediately before the amplitude of received signal 2 increases, the state of switch 210 is changed.

In the example shown in FIG. 12, when the timing signals from the frequency divider 212 and analysis circuit 221 are not equal, switch 210 can not change its state for at least M samples thereafter. Accordingly, the changeover cycle of switch 210 becomes an integer multiple of M. However, it is also possible to provide a configuration of pre-processing circuit 200, in which the changeover cycle of switch 210 is not an integer multiple of M.

Figure 15:
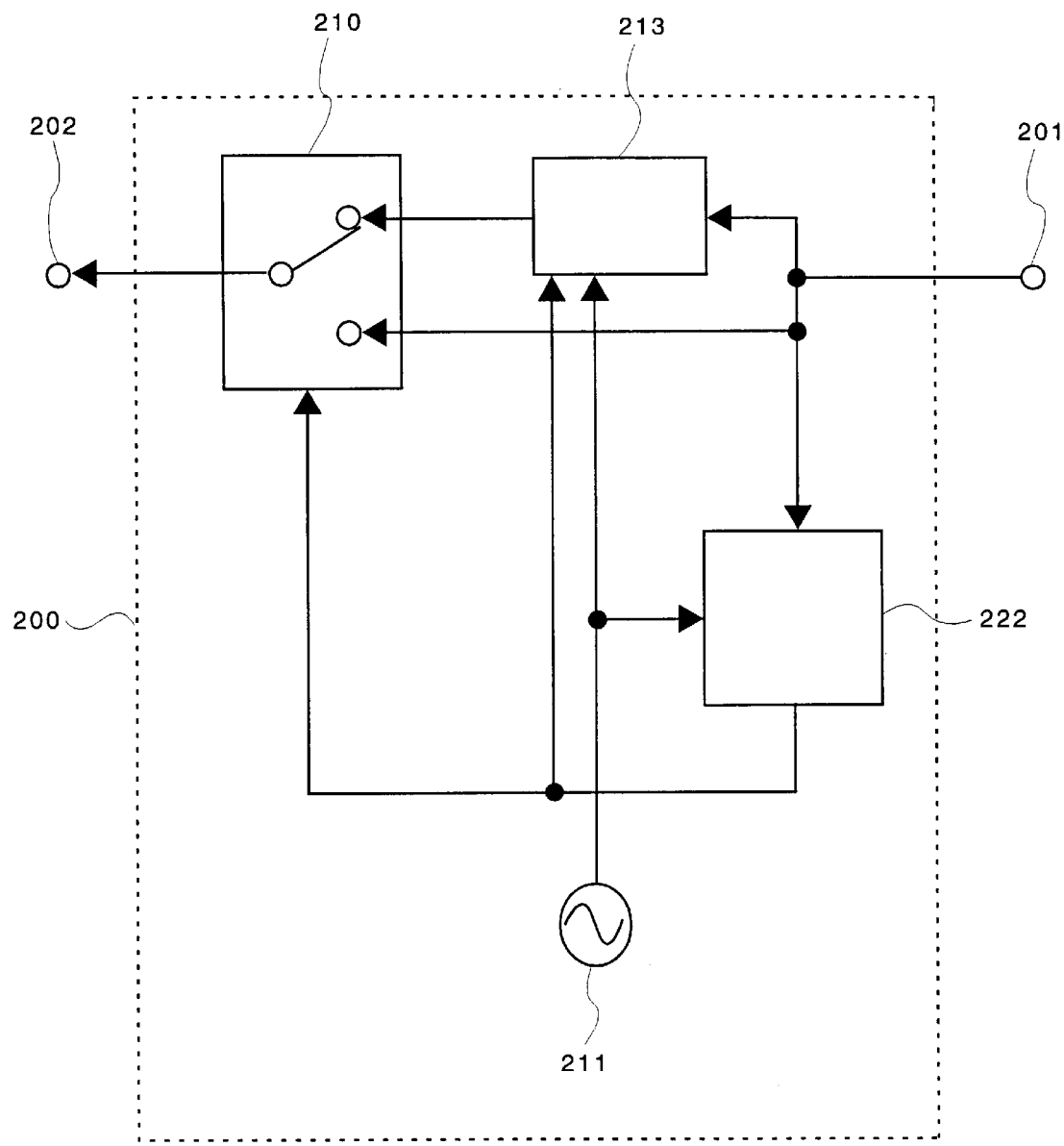
FIG. 15 is a block diagram showing the third example of the pre-processing circuit 200.

FIG. 15 is a block diagram showing a third example of pre-processing circuit 200. The difference between the third example and the second example shown in FIG. 12, is that the third example has new analysis circuit 222 in place of frequency divider 212, analysis circuit 221 and AND circuit 220. Accordingly, in the second example shown in FIG. 12, switch 210 is controlled by the logical product of the outputs of frequency divider 212 and analysis circuit 221. On the contrary, in the third example shown in FIG. 15, the control signal of switch 210 is directly generated by analyzing received signal 2 in analysis circuit 222 and by combining it with the rectangular pulses supplied to analysis circuit 222. Analysis circuit 222 analyzes in basically the same manner as in analysis circuit 221. Analysis circuit 222 may detect a change in amplitude of received signal 2, or may analyze the signal based on pre-/post-masking. After the analysis, analysis circuit 222 outputs a control signal "1" when its analysis means a transition of switch 210 and it is more than a predetermined sampling period($M_2T$) passes since the previous changeover. Here, symbol $M_2$ is a positive integrer satisfying $M_2>1$. Otherwise, analysis circuit 222 outputs "0". The control signal is transferred to switch 240 to control its own changeover. As a detailed evaluation of the sampling period, a counter counts the number of pulses of rectangular pulses 144, and compares the count with $M_2$ stored in a memory. After the comparison, when these values are equal it is considered $M_2T$ to output "1", and at the same time, the counter is reset.

In FIG. 10, even though time-varying coefficients $c_j$ (j=0, 1, ..., L-1) of filter 213 for L=2 has been described in order to suppress the subjective noise caused by signal discontinuity, it is possible to construct pre-processing circuit 200 which does not need switch 210 in FIGS. 11, 12 and 15 by appropriately setting coefficients $c_0(k)$ and $c_1(k)$.

Figure 16:
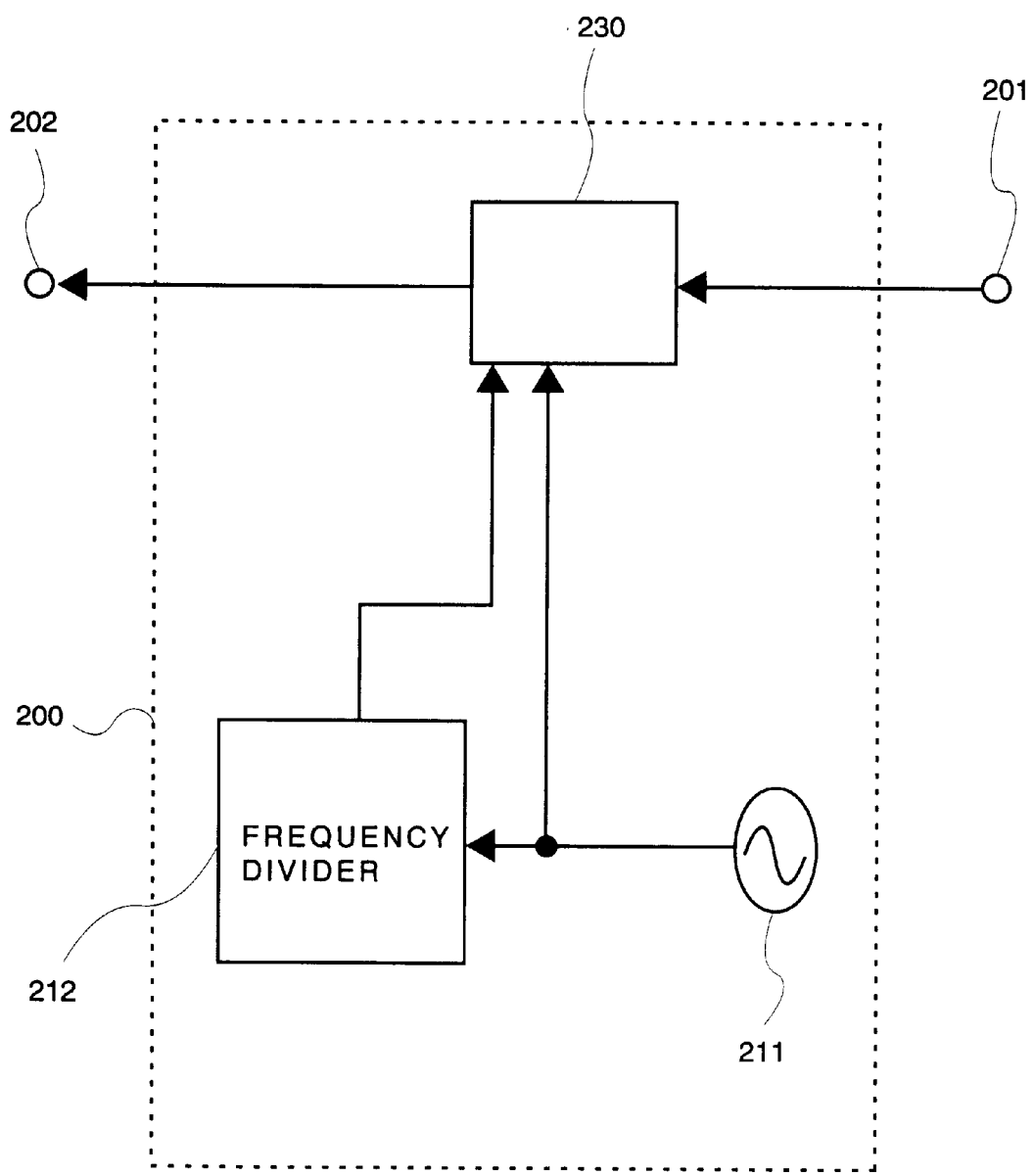
FIG. 16 is a block diagram showing the fourth example of the pre-processing circuit 200.

FIG. 16 is a block diagram showing the fourth example of pre-processing circuit 200. Received signal 2 supplied to input terminal 201 is supplied to filter 230. Filter 230 filters received signal 2 and supplies it to output terminal 202. The control signal is supplied from clock signal generator 211 and frequency divider 212 to filter 230. Clock signal generator 211 generates rectangular pulses having a cycle equal to the sampling period T of received signal 2. Division of the frequency of the clock supplied from frequency divider 212 results in the control signal. Filter 230 controls time-varying coefficients based on the control signals.

Figure 17:
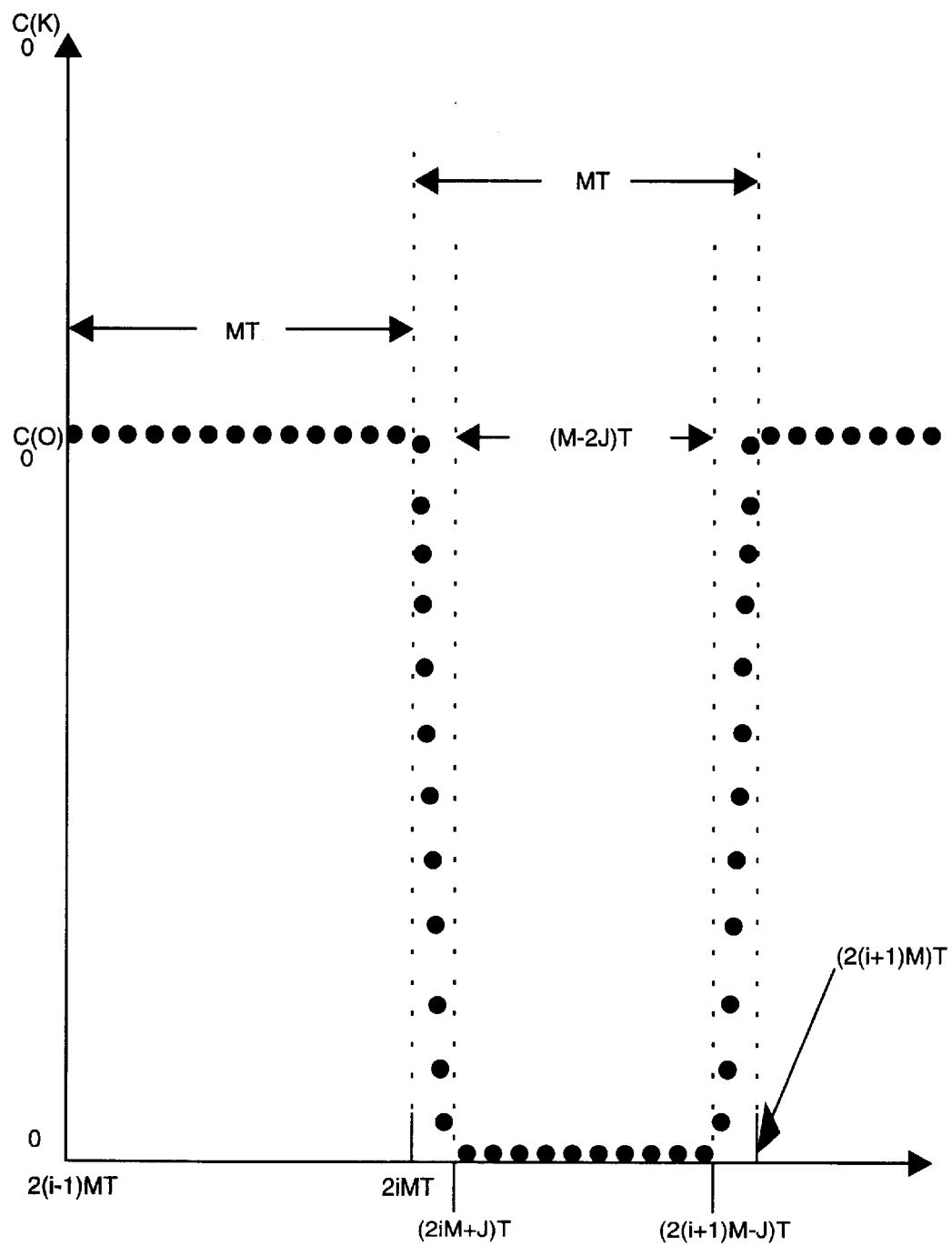
FIG. 17 is a graph representing a time varying coefficient c0(k) of the filter shown in FIG. 10.

Assuming L=2 in FIG. 10, $c_0(k)$ is defined as shown in FIG. 17, and $c_1(k)$ by the following equation.

$$c_1(k)=1-c_0(k) \quad (22)$$

Where, i in FIG. 17 is an arbitrary integer. Though $c_0(k)$ alternates between $c_0(0)$ and 0 with a period of 2MT, however, it makes smooth and linear transition form $c_0(0)$ to 0, or 0 to $c_0(0)$ for the initial and the final JT of period of 0. Since $c_1(k)$ is given by equation (22), one of $c_0(k)$ and $c_1(k)$ alternately takes for most of the time. That is, $c_0(k)$ and $c_1(k)$ becomes exclusive and equivalent switching operation to that of switch 210 can be performed without switch 210 in FIG. 9. For L≠2, parallel connection of each tap of filter 230 may be considered equivalent. Accordingly, $c_0(k)$ and $c_1(k)$, $c_2(k)$, ..., $C_{L-1}(k)$ become exclusive, and c0(k) and the others alternately takes zero. Values of $c_1(k)$, $c_2(k)$, ..., $C_{L-1}(k)$ and corresponding value of J thereto may be different from each other.

Figure 18:
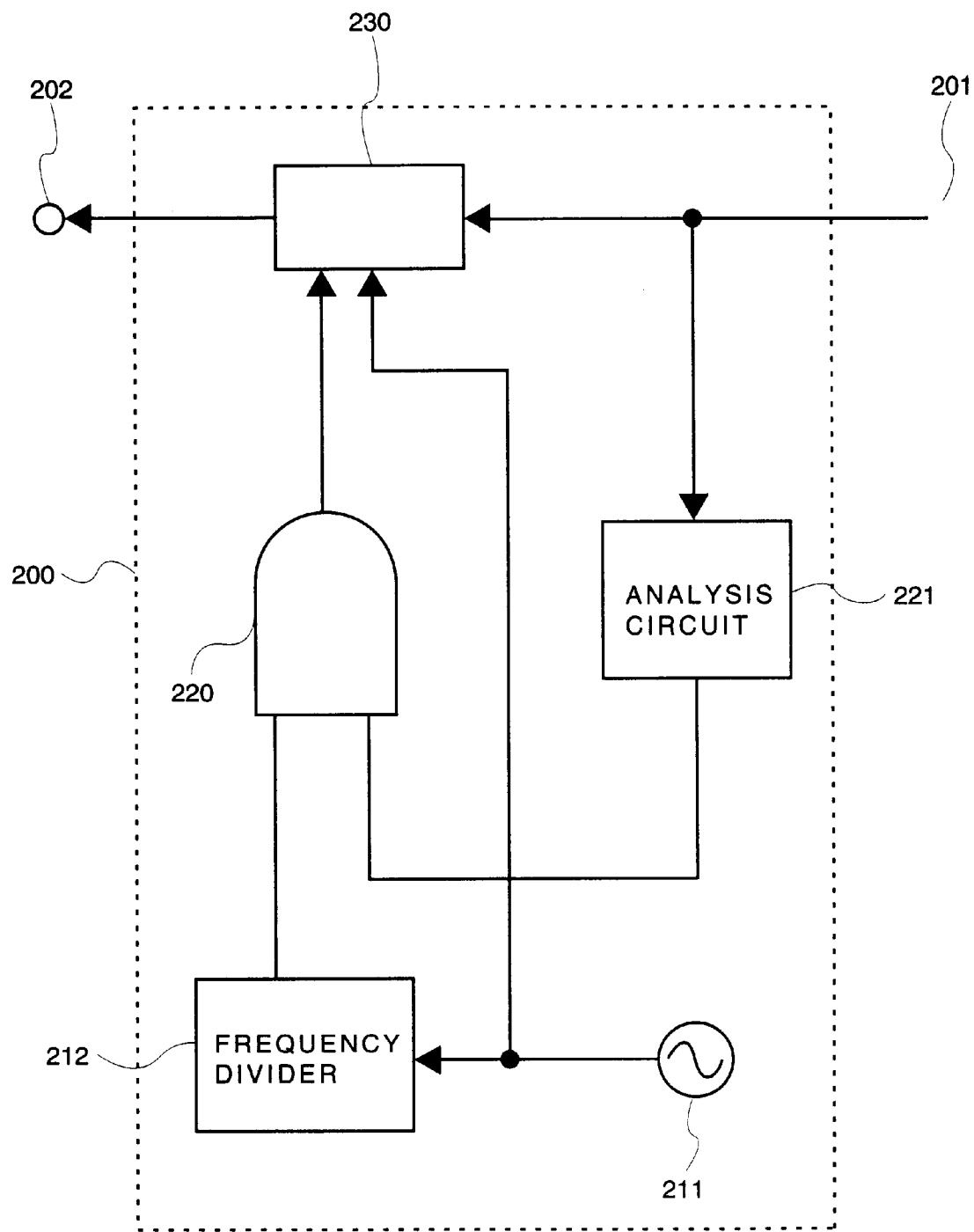
FIG. 18 is a block diagram showing the fifth example of the pre-processing circuit 200.

FIG. 18 is a block diagram showing a fifth example of pre-processing circuit 200. Received signal 2 supplied to input terminal 201 is supplied to filter 230. Filter 230 filters the received signal and supplies it to output terminal 202. Signals are supplied from analysis circuit 211 and frequency divider 212 to AND circuit 220. A signal supplied from frequency divider 212 to the AND circuit 220 is generated by dividing the frequency of the clock signal supplied from clock signal generator 211. Analysis circuit 212 analyzes received signal 2, outputs "1" when the analyzed result satisfies a predetermined condition, and "0" otherwise, and transfers it to AND circuit 220. As described above, AND circuit 220 also receives a control signal of "0" or "1" from frequency divider 212. AND circuit 220 that the outputs as timing data from analysis circuit 221 and frequency divider 212 are both identical to a cycle of M samples, and that the analyzed result of the input signal satisfies the predetermined conditions, and supplies the output signal to filter 230. Filter 230 controls time-varying coefficients based on these control signals.

Figure 19:
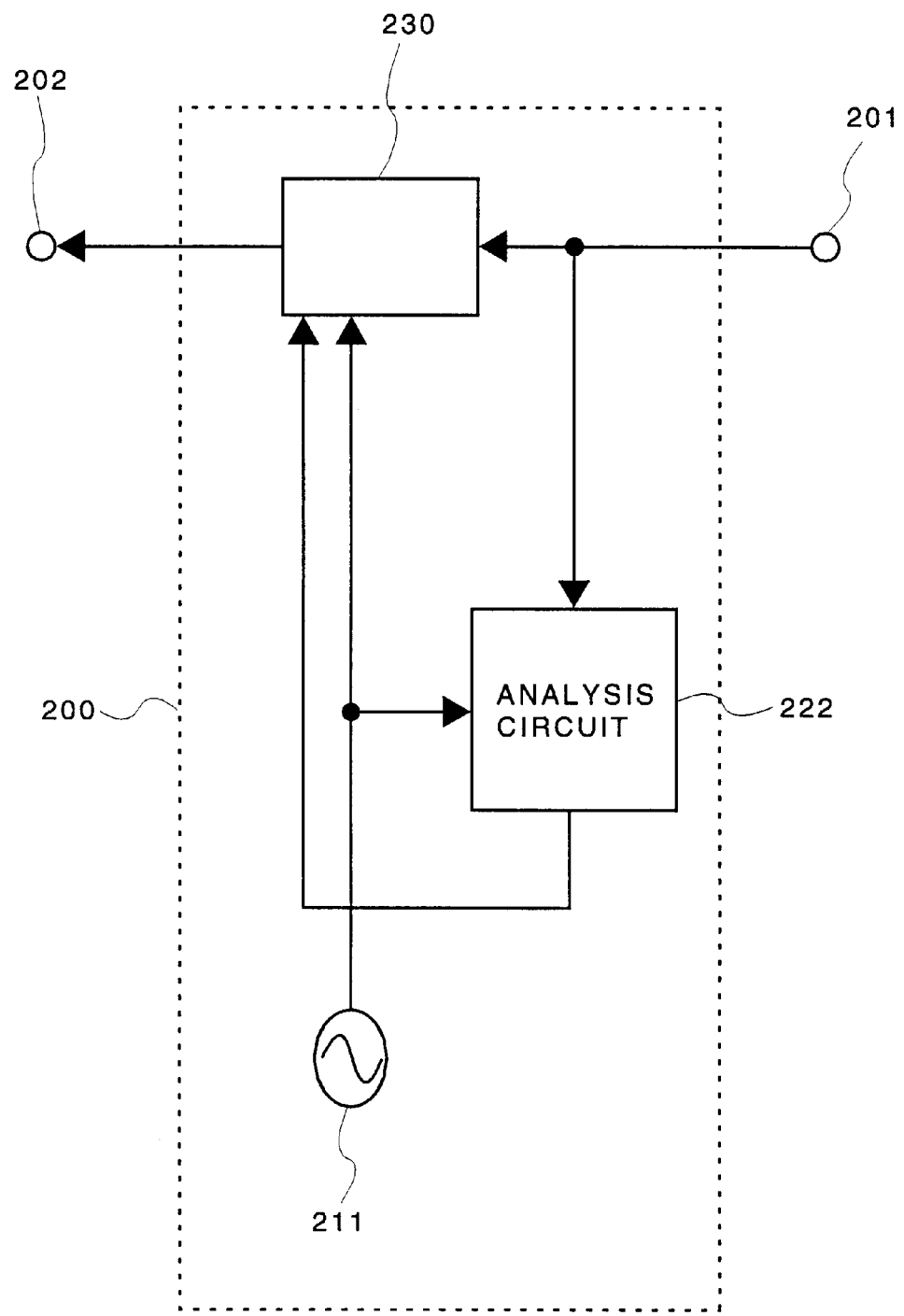
FIG. 19 is a block diagram showing the sixth configured example of the pre-processing circuit 200.

FIG. 19 is a block diagram showing a sixth example of pre-processing circuit 200. The difference between the fifth example shown in FIG. 18 and the sixth example is that new analysis circuit 222 is provided in place of frequency divider 212, analysis circuit 221 and AND circuit 220. That is, in the example in FIG. 18, the logical product of the outputs from frequency divider 212 and analysis circuit 221 controls the time-varying coefficients of filter circuit 230. However, in the example in FIG. 19, received signal 2 is analyzed in analysis circuit 222, which directly generates the control signal of filter circuit 230 by using the rectangular pulses supplied from clock signal generator circuit 211 to analysis circuit 222 together with the analyzed result.

Entire description using FIGS. 8, 9, 12 and 15 relates to the case that pre-processing circuit 200 applies to the received signal 2 to generate pre-processing signal. However, it is clear that a similar description with respect to the received signal 1 may be provided by applying pre-processing circuit 200 to received signal. Next, a new case where the pre-processing circuit applies to received signal 2 to generate the pre-processed signal and an amplitude correction circuit applies to received signal 1 will be described.

Figure 20:
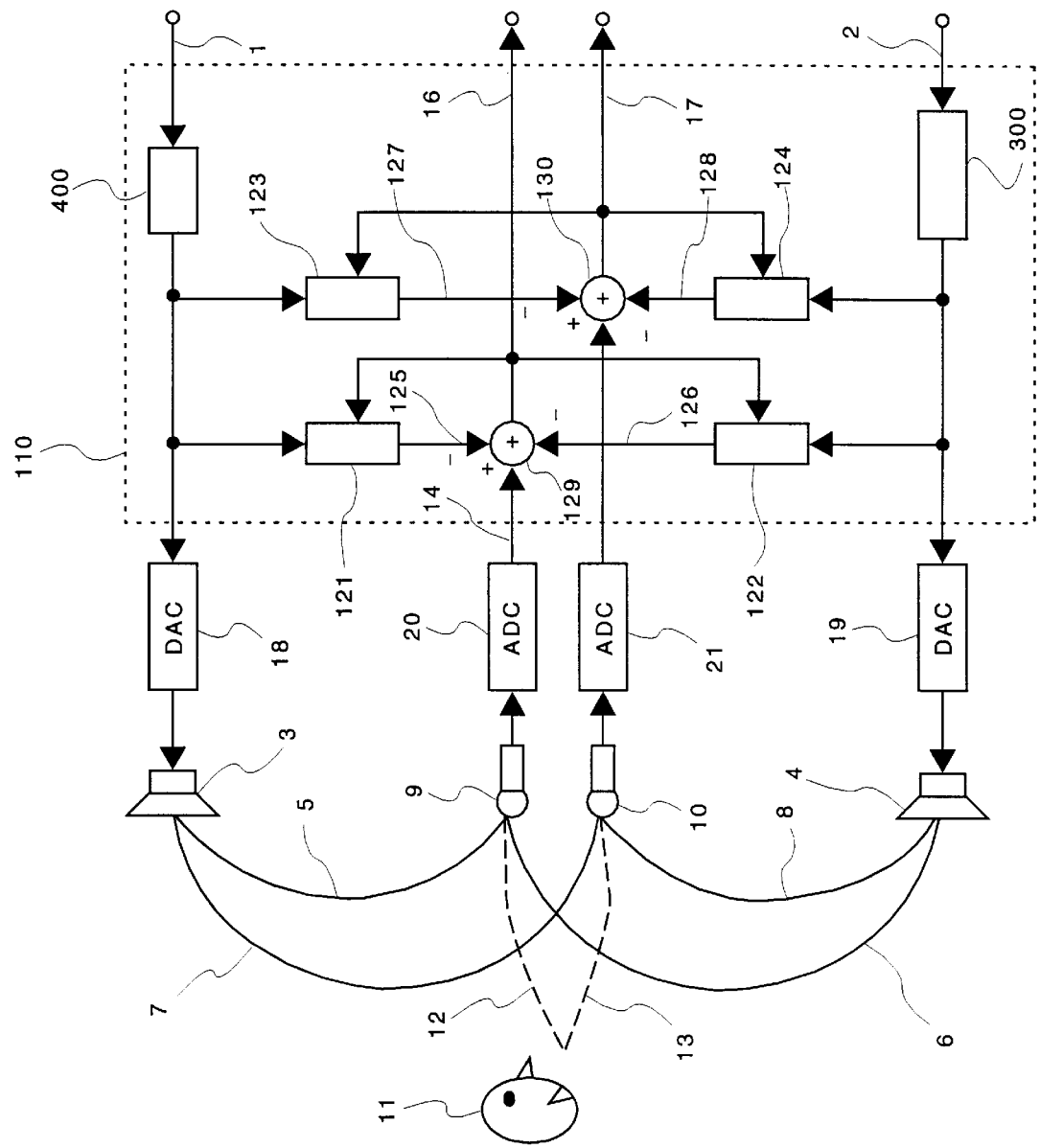
FIG. 20 is a block diagram showing the fifth embodiment of a multi-channel echo canceller apparatus according to the present invention.

FIG. 20 shows the fifth embodiment of the present invention in the case where the multi-channel echo canceller has respectively two channels of the received signals and the transmission signals. The difference between the fifth embodiment and the fourth embodiment shown in FIG. 8 is not only that received signal 2 supplied to adaptive filters 122 and 124 is pre-processed by pre-processing circuit 300, but also that received signal 1 supplied to adaptive filter 121 and 123 is corrected its amplitude by amplitude correction circuit 400. Pre-processing circuit 300 makes the coefficients converge to the correct values by pre-processing the received signal in the same manner as in pre-processing circuit 200.

Amplitude correction circuit 400 compensates for an image shift in the acoustic space caused by pre-processing in pre-processing circuit 300, by means of an amplitude correction of received signal 1. Pre-processing circuit 300 corrects the amplitude of received signal 2 whenever an amplitude correction is performed in amplitude correction circuit 400. Both preprocessing circuit 300 and amplitude correction circuit 400 may have the same configuration as that of pre-processing circuit 200 as shown in FIGS. 9, 12, 15, 16, 18 and 19. However, when applying the configuration shown in FIGS. 9, 12 and 15, filter 213 should have a different configuration from that shown in FIG. 10. Further, when applying the configuration shown in FIGS. 16, 18 and 19, filter 230 should have different configuration from that shown in FIG. 10.

Figure 21:
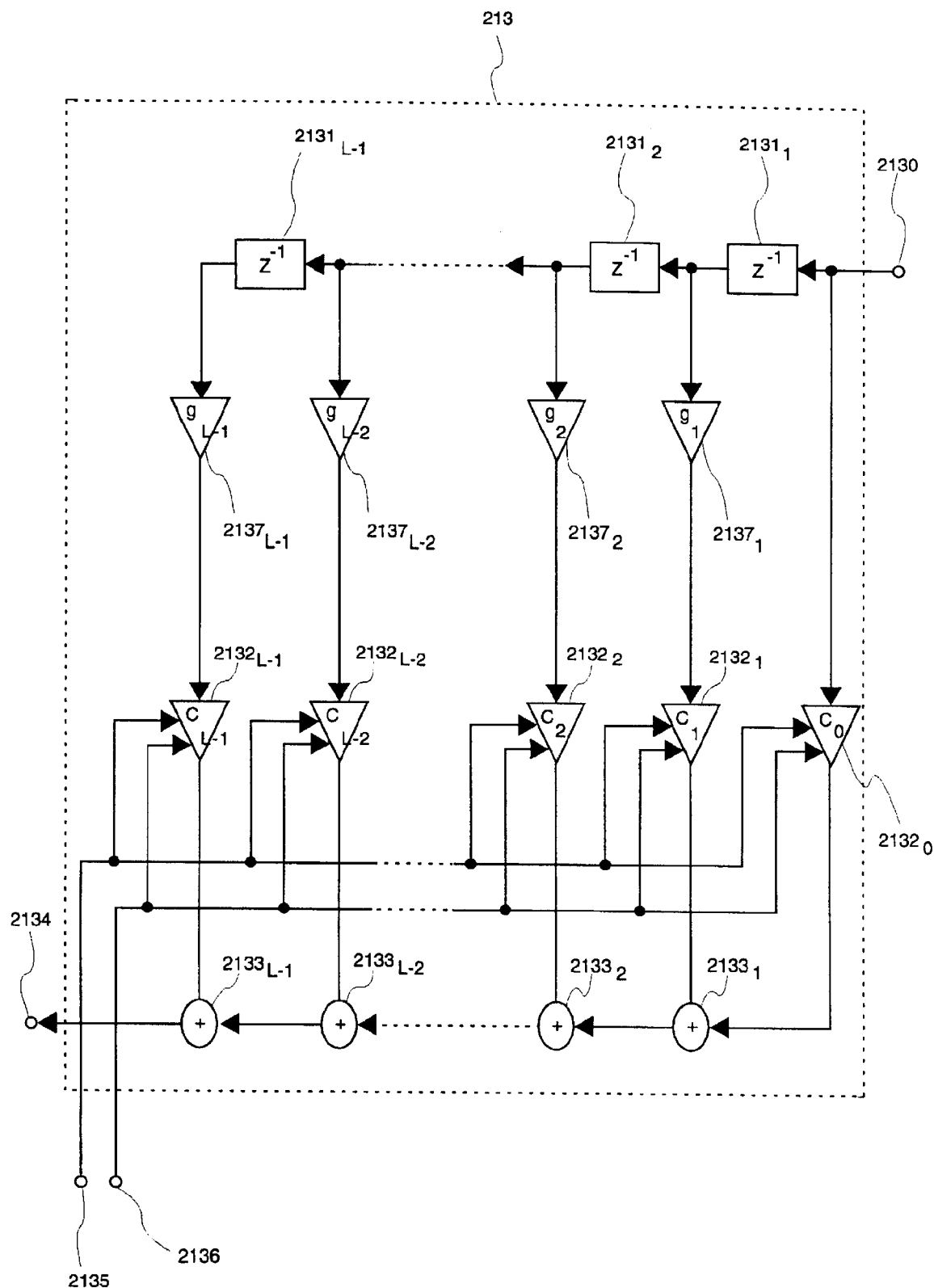
FIG. 21 is a block diagram showing an example of the filter 213 or 230 included in the pre-processing circuit 300.

FIG. 21 is a block diagram showing an example of filter 213 when pre-processing circuit 300 has the configuration shown in FIGS. 9, 12 and 15, and also an example of filter 230 when pre-processing circuit 300 has the configuration shown in FIGS. 16, 18 and 19. In this description, even though an L-tap FIR filter is assumed, other constructions such as IIR filter may be applied. The difference between FIGS. 21 and 10 is that additional coefficient multipliers $g_1$, $g_2, \ldots, g_{L-1}$ are connected in series with all of coefficient multipliers $c_1, c_2, \ldots c_{L-1}$ except $c_0$. This means that coefficient multipliers $c_0, c_1, \ldots c_{L-1}$ in FIG. 10 are equivalently replaced by coefficient multipliers $c_0, g_1c_1, \ldots g_{L-1}c_{L-1}$, and that operation of the circuit shown in FIG. 21 is completely the same as that of the circuit shown in FIG. 10. Accordingly, it is clearly possible to use the filter shown in FIG. 10 in the manner that the coefficient multipliers $2132_1, 2132_2, \ldots, 2132_{L-1}$ respectively have $g_1c_1, \ldots g_{L-1}c_{L-1}$ in place of $c_1, C_2, \ldots, c_{L-1}$.

Figure 22:
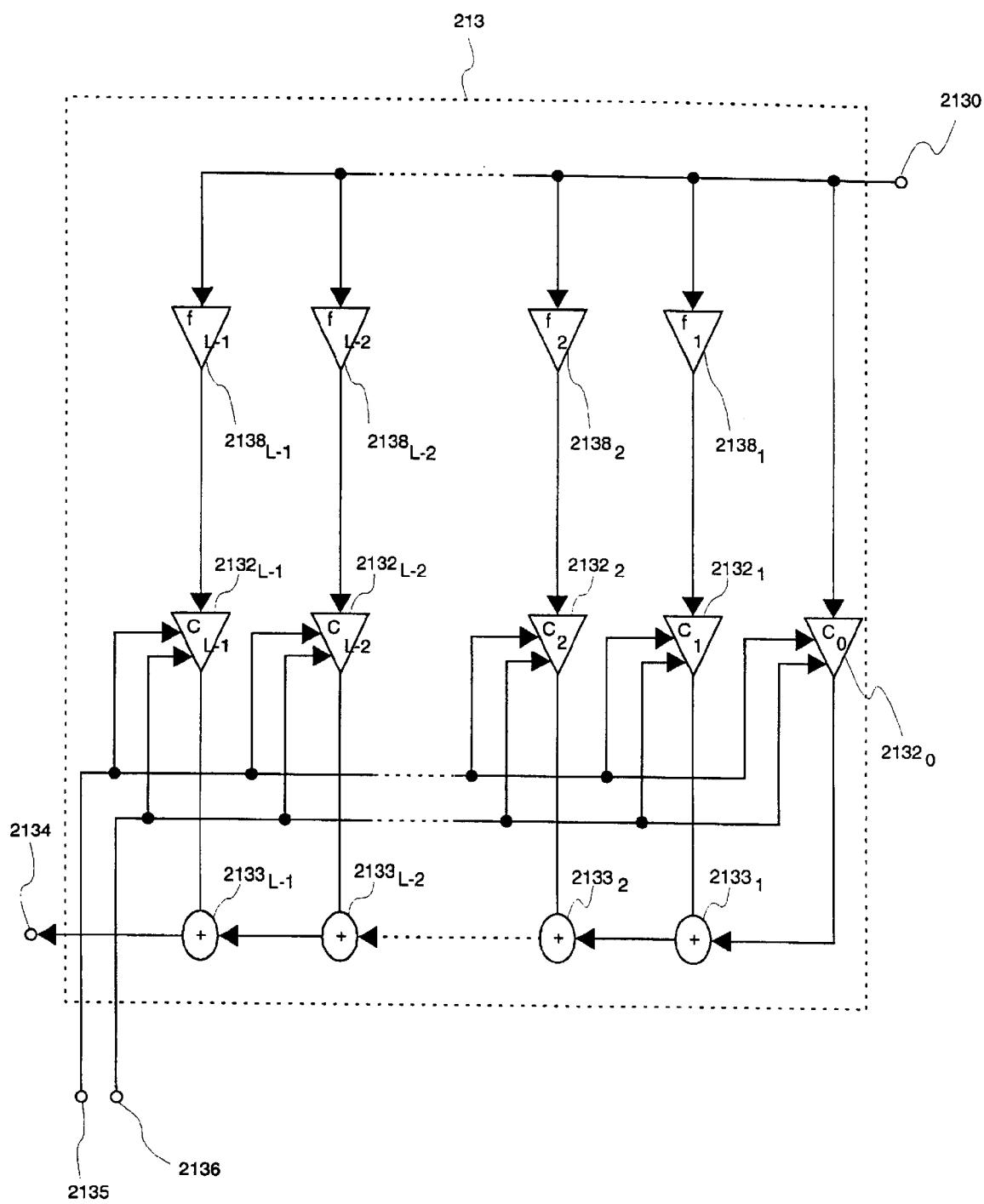
FIG. 22 is a block diagram showing a first configured example of the filter 213 or 230 included in the amplitude correction circuit 400.

FIG. 22 is a block diagram showing an example of filter 213 when amplitude correction circuit 400 has the configuration shown in FIGS. 9, 12 and 15, and also an example of filter 230 when amplitude correction circuit 400 has the configuration shown in FIGS. 16, 18 and 19. In this description, even though an L-tap FIR filter is assumed, other constructions such as IIR filter may also be. The difference between FIGS. 22 and 21 is that, delay elements $2131_1, 2131_2, 2131_{L-1}$ are not provided.

Operation of the filters shown in FIGS. 21 and 22 are complementarily to each other. That is, each corresponding pair of coefficients $2137_i$ and $2138_i$ (i=1, 2, . . . , L–1) corrects the shift of the image.

The principle that the amplitude correction can compensate for the image shift caused by the change of relative delay, is disclosed in "Medical Research Council Special Report" No. 166, 1932, pp1–32 (hereafter referred Reference 8), "Journal of Acoustical Society of America" Vol. 32, 1960, pp685–692 (hereafter referred as Reference 9), and "Journal of Acoustical Society of America" Vol. 94, 1993, pp98–110 (hereafter referred as Reference 10). In the example shown in FIG. 20, because received signal 2 is delayed, the acoustic image reproduced by speakers 3 and 4 for talker 11 is shifted in the direction of the speaker 3. For correction of this shifted to recover the original image, the amplitude of the signal radiated from speaker 4 in the acoustic space is to be increased, and the amplitude of the other signal from speaker 3 is to be decreased simultaneously.

According to Reference 10, the relationship represented by equation (23) should be established between respective electric powers $P_1$ dB and $P_2$ dB in order to move the image back by the amplitude correction under the condition that total power of received signals 1 and 2 is kept constant:

$$P_1 + P_2 = C \quad (23)$$

Here, C is a positive constant. Accordingly, when the powers of received signals 1 and 2 are respectively $\bar{P}_1$ bar dB and $\bar{P}_2$ bar dB before the amplitude correction, the power P1 dB and P2 dB of received signals 1 and 2 after the amplitude correction should satisfy the relationship defined as follows:

$$P_1 = \bar{P}_1 - \Delta P/2 \quad (24)$$

$$P_2 = \bar{P}_2 + \Delta P/2 \quad (25)$$

Here, $\Delta P/2$ is a power correction factor. Therefore, amplitude correction factors gi and fi of coefficient multipliers corresponding to the filters shown in FIGS. 21 and 22 can be determined by equations (26) and (27) as follows:

$$f_i = 10^{\frac{-\Delta P_i}{40}} \quad (26)$$

$$g_i = 10^{\frac{\Delta P_i}{40}} \quad (27)$$

where, $\Delta P_i$ is a power correction factor necessary to compensate for an i-sample delay of the received signal.

Figure 23:
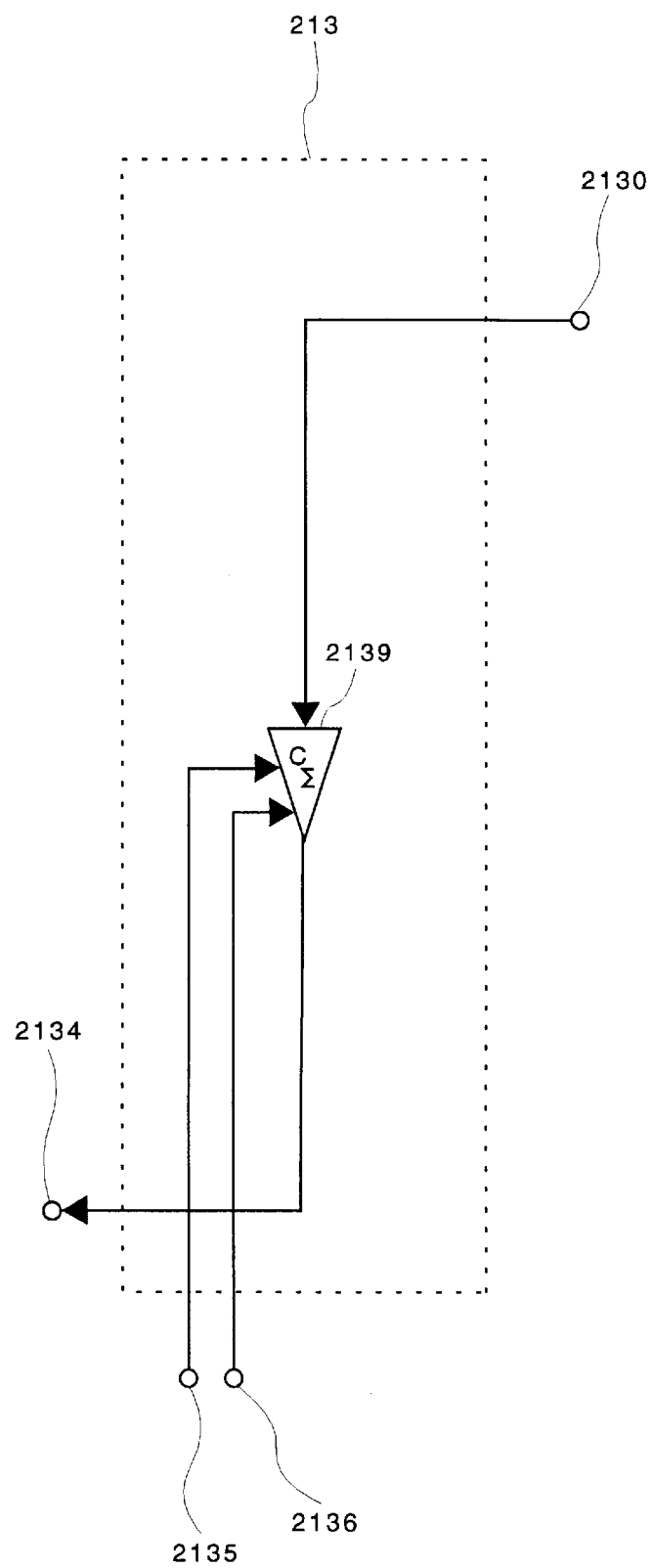
FIG. 23 is a block diagram showing a second configured example of the filter 213 or 230 included in the amplitude correction circuit 400.

FIG. 23 is another example of $C_\Sigma$ the filter shown in FIG. 22. Though pluralities of the coefficient multipliers connected in cascade are connected in parallel in FIG. 22, these multipliers are integrated into a single multiplier in FIG. 23. The input signal is supplied to input terminal 2130, and a multiplier 2139 having a time-varying coefficient multiplies the input signal by $C_\Sigma$. The obtained output signal is outputted through the output terminal 2134.

$C_\Sigma$ is obtained by the following equation.

$$c_\Sigma = c_0 + \sum_{i=1}^{L-1} f_i c_i \quad (28)$$

In the above-described description using FIGS. 20–23, pre-processing circuit 300 is used for received signal 2 and amplitude correction circuit 400 is applied to received signal 1. However, the same description may be provided in the case that the signals are interchanged with each other, pre-processing circuit 300 is applied to received signal 1, and amplitude correction circuit 400 is applied to the received signal 2.

Further, even though the above-described several embodiments relate to echo cancellation for multi-channel television conference systems, a similar discussion can be established for a single-channel multi-point television conference system as another application of multi-channel echo cancellation. In the single-channel multi-point television conference system, there is processing of the proper attenuation and delay are added to the voice of the talkers recorded by one microphone of the talker is located at a desired position amongst a plurality of speakers used at the receive side. The same number of signals processed in this manner as the number of the speakers used at the receive side. When the number of the speakers used at the receive side is equal to two, the first and the second received signals 1 and 2 correspond to the two signals, to which the attenuation and delay are added in the conventional example shown in FIG. 24. Accordingly, the embodiments of the present invention can apply to single-channel multi-point case as it is.

Even though the description has been made with an example of the case of having the first and the second received signals 1 and 2 and the first and the second mixed signals 14 and 15 in shown in FIG. 20, the present invention is applicable to the case of having a plurality of received signals and a single or a plurality of transmission signal/signals. Further, even though the description has been performed with an example that the acoustic echo canceller cancels the acoustic echo which is generated by propagating the received signal transmitting from the speaker through the spatial acoustic path to the microphone, the present invention is applicable to any other echoes except the acoustic echo, such as an echo generated by cross talk in a transmission line. Furthermore, even though there has been described an example using non-recursive adaptive filters with the LMS algorithm as adaptive filters 121, 122, 123, and 124, the present invention is applicable to an arbitrary type of adaptive filter. For example, when a non-recursive adaptive filters with the NLMS algorithm are used, filter coefficients are updated by equations (29) and (30) as follows:

$$w_{1,i}(n+1) = w_{1,i}(n) + \mu e_1(n) \frac{x_1(n-i)}{\sum_{i=o}^{N-1} x_1^2(n-i)} \quad (29)$$

$$w_{2,i}(n+1) = w_{2,i}(n) + \mu e_2(n) \frac{x_2(n-i)}{\sum_{i=0}^{N-1} x_2^2(n-i)} \quad (30)$$

As an algorithm for the adaptive filter, it also possible to use a sequential regression algorithm (SRA) disclosed in Reference 5, and an RLS algorithm disclosed in Reference 6. A recursive adaptive filter may apply in place of the non-recursive adaptive filter. Further, sub-band adaptive filters or transform-domain adaptive filters may also be used.

The multi-channel echo cancellation method and apparatus according to the present invention generate the supplemental signal after filtering one of the received signals, and make the adaptive filter use a new received signal that is obtained by multiplexing the original signal and the supplemental signal. Since the adaptive filter driver by the input signal obtained by multiplexing the original signal and the newly generated supplemental signal, a plurality of adaptive filters estimate echoes occurring in a plurality of transmission paths from one signal source. Accordingly, since the number of conditions for obtaining the adaptive filter coefficients increases, there is no problem that the solution becomes indefinite. As has been described in the paragraphs of the embodiment, a reason of this is that the present invention can use six conditional equations which are twice as many as the number for the conventional echo canceller based on linear combination on the other hand, the conventional echo canceller can use only three equations shown in the equation (7). Accordingly, the adaptive filter coefficients converge to the optimum values uniquely defined.

Further, since the parameters for multiplexing the original received signal and the supplemental signal are controlled on the basis of the characteristics of the received signal, and at the same time, since the image shifted caused by introduction of the supplemental signal is cancelled by amplitude correction for the input signal, it is possible to suppress the deterioration of the sound quality of the received signal directly supplied to the speakers and heard by the listener, and to keep excellent sound quality.

The entire disclosures of Japanese Patent Application No. 9-097086 filed on Apr. 15, 1997 and Japanese Patent Application No. 9-320582 filed on Nov. 07, 1997 including specification, claims, drawing and summary are incorporated herein by reference in its entirety.

What is claimed is:

1. An echo cancelling method for a multi-channel communication connecting a first and a second station, said method comprising the steps of:

selecting one of a plurality of incoming signals received at said first station from said second station;

filtering said selected incoming signal to produce a filtered signal;

generating a composite signal by alternately outputting said selected incoming signal and said filtered signal at a fixed switching rate which is lower than a sampling frequency associated with the selected incoming signal;

processing said composite signal and each incoming signal other than the selected incoming signal through separate adaptive filters to create a plurality of echo replica signals; and subtracting selected ones of said echo replica signals from signals being transmitted from said first station to said second station such that an echo replica signal derived from said composite signal and from each incoming signal other than said selected signal is subtracted from each transmitted signal.

2. An echo cancelling method for a multi-channel communication connecting a first and a second station, said method comprising the steps of:

selecting one of a plurality of incoming signals received at said first station from said second station;

filtering said selected incoming signal to produce a filtered signal;

generating a clock signal having a frequency that is lower than a sampling frequency associated with said selected incoming signal;

analyzing said selected incoming signal to produce a result signal in response to a predetermined property of said selected incoming signal;

generating a composite signal by alternately outputting said selected incoming signal and said filtered signal at a switching rate determined by a logical product of said result signal and said clock signal;

processing said composite signal and each incoming signal other than the selected incoming signal through separate adaptive filters to create a plurality of echo replica signals; and subtracting selected ones of said echo replica signals from signals being transmitted from said first station to said second station such that an echo replica signal derived from said composite signal and from each incoming signal other than said selected signal is subtracted from each transmitted signal.

3. The method for cancelling a multi-channel echo as set forth in claim 2, wherein said step of analyzing said selected incoming signal is performed by post-masking analysis.

4. The method for cancelling a multi-channel echo as set forth in claim 2, wherein said step of analyzing said selected incoming signal is performed by pre-masking analysis.

5. An echo cancelling method for a multi-channel communication connecting a first and a second station, said method comprising the steps of:

selecting one of a plurality of incoming signals received at said first station from said second station;

filtering said selected incoming signal to produce a filtered signal;

analyzing said selected incoming signal to produce a result signal in response to a predetermined property of said selected incoming signal;

generating a composite signal by alternately outputting said selected incoming signal and said filtered signal in response to said result signal and passage of a predetermined time interval after a previous output alternation;

processing said composite signal and each incoming signal other than the selected incoming signal through separate adaptive filters to create a plurality of echo replica signals; and subtracting selected ones of said echo replica signals from signals being transmitted from said first station to said second station such that an echo replica signal derived from said composite signal and from each incoming signal other than said selected signal is subtracted from each transmitted signal.

6. The method for cancelling a multi-channel echo as set forth in claim 5, wherein said step of analyzing said selected incoming signal is performed by post-masking analysis.

7. The method for cancelling a multi-channel echo as set forth in claim 5, wherein said step of analyzing said selected incoming signal is performed by pre-masking analysis.

8. An echo cancelling method for a multi-channel communication connecting a first and a second station, said method comprising the steps of:
   selecting one of a plurality of incoming signals received at said first station from said second station;
   filtering said selected incoming signal to produce a filtered signal;
   generating a composite signal by multiplexing said selected incoming signal and said filtered signal;
   processing said composite signal and each incoming signal other than the selected incoming signal through separate adaptive filters to create a plurality of echo replica signals; and
   subtracting selected ones of said echo replica signals from signals being transmitted from said first station to said second station such that an echo replica signal derived from said composite signal and from each incoming signal other than said selected signal is subtracted from each transmitted signal.

9. The method for cancelling a multi-channel echo as set forth in claim 8, wherein said multiplexing is performed by alternately outputting said selected incoming signal and said filtered signal.

10. The method for cancelling a multi-channel echo as set forth in claim 8, wherein said filtered signal is generated by processing said selected incoming signal using a plurality of time-varying filter coefficients having zero and non-zero values.

11. The method for cancelling a multi-channel echo as set forth in claim 8, wherein said selected incoming signal and said filtered signal are multiplexed at a constant sampling frequency that is lower than a sampling frequency associated with the signals being multiplexed.

12. The method for cancelling a multi-channel echo as set forth in claim 8, further including the step of:
   analyzing said selected incoming signal to produce a result signal that varies in response to a predetermined property of said selected incoming signal; and wherein:
   said selected incoming signal and said filtered signal are multiplexed at a sampling frequency that is lower than a sampling frequency associated with the signals being multiplexed, and varies in accordance with said result signal.

13. An echo cancelling method for a multi-channel communication connecting a first and a second station, said method comprising the steps of:
   selecting one of a plurality of incoming signals received at said first station from said second station;
   filtering said selected incoming signal to produce a filtered signal;
   performing amplitude adjustment on said filtered signal to generate a first amplitude-adjusted signal;
   generating a composite signal by multiplexing said first amplitude-adjusted signal and said filtered signal;
   generating a plurality of first echo replica signals by processing said composite signal through a first plurality of adaptive filters;
   performing amplitude adjustment on each incoming signal other than said selected incoming signal to generate a second amplitude-adjusted signal corresponding thereto;
   generating a second echo replica signal by processing each second amplitude-adjusted signal through an adaptive filter; and
   subtracting selected ones of said echo replica signals from signals being transmitted from said first station to said second station such that an echo replica signal derived from said composite signal and from each incoming signal other than said selected signal is subtracted from each transmitted signal.

14. The method for cancelling a multi-channel echo as set forth in claim 13, wherein said multiplexing step is performed by alternately outputting said selected incoming signal and said filtered signal.

15. The method for cancelling a multi-channel echo as set forth in claim 13, wherein said filtered signal is generated by processing said selected incoming signal using a plurality of time-varying filter coefficients having zero and non-zero values.

16. The method for cancelling a multi-channel echo as set forth in claim 13, wherein said selected incoming signal and said filtered signal are multiplexed at a constant sampling frequency that is lower than a sampling frequency associated with the selected incoming signal.

17. The method for cancelling a multi-channel echo as set forth in claim 13, further including the step of:
   analyzing said selected incoming signal to produce a result signal that varies in response to a predetermined property of said selected incoming signal; and wherein:
   said selected incoming signal and said filtered signal are multiplexed at a sampling frequency that is lower than a sampling frequency associated with the signals being multiplexed, and varies in accordance with said result signal.

18. An echo cancelling apparatus for a multi-channel communication including a first and a second station, said apparatus comprising:
   a filter connected to process a selected incoming signal received at said first station from said second station and operative to generate a filtered signal;
   a switch operative in response to a control signal to alternately couple said selected incoming signal and said filtered signal to an output terminal to generate a composite signal;
   a plurality of first adaptive filters, each responsive to said composite signal to generate a plurality of echo replica signals;
   a second adaptive filter responsive to each incoming signal other than the selected incoming signal to generate an echo replica signal derived from input signal, the number of first and second adaptive filters being equal to the number of echo sources in said communication system;
   a frequency divider responsive to a clock signal to generate a lower frequency clock signal;
   a plurality of subtraction circuits operative to subtract said echo replica signals from each signal transmitted from said first station to said second station such that one of said first echo replica signals and an echo replica signal derived from each incoming signal other than said selected incoming signal are subtracted from each transmitted signal; and
   a control circuit responsive to said lower frequency clock signal to generate said control signal for said switch, whereby said adaptive filters are controlled by said switch to minimize the output of said plurality of subtraction circuits.

19. An echo cancelling apparatus for a multi-channel communication including a first and a second station, said apparatus comprising:
- a filter connected to process a selected incoming signal received at said first station from said second station and operative to generate a filtered signal;
- a switch operative in response to a control signal to alternately couple said selected incoming signal and said filtered signal to an output terminal to generate a composite signal;
- a frequency divider responsive to a reference clock signal to generate a lower frequency clock signal;
- an analysis circuit responsive to said selected incoming signal to generate an output signal representative of a predetermined property of said incoming signal;
- a AND circuit operative to generate a logical product based on said lower frequency clock signal and the output signal from said analysis circuit;
- a plurality of first adaptive filters, each responsive to said composite signal to generate a plurality of echo replica signals;
- a second adaptive filter responsive to each incoming signal other than the selected incoming signal to generate an echo replica signal from the incoming signal input thereto,
- the number of first and second adaptive filters being equal to the number of echo sources in said communication system;
- a plurality of subtraction circuits operative to subtract said echo replica signals from each signal transmitted from said first station to said second station such that such that one of said first echo replica signals and an echo replica signal derived from each incoming signal other than said selected incoming signal are subtracted from each transmitted signal; and
- a control circuit responsive to an output of said AND circuit to generate said control signal for said switch,
- whereby said adaptive filters are controlled by said switch to minimize the output of said plurality of subtraction circuits.

20. An echo cancelling apparatus for a multi-channel communication including a first and a second station, said apparatus comprising:
- a filter connected to process a selected incoming signal received at said first station from said second station and operative to generate a filtered signal;
- a switch operative in response to a control signal to alternately couple said selected incoming signal and said filtered signal to an output terminal to generate a composite signal;
- a frequency divider responsive to a reference clock signal to generate a low frequency clock signal;
- an analysis circuit responsive to a predetermined property of said selected incoming signal and to a clock signal to generate an output signal;
- a plurality of first adaptive filters, each responsive to said composite signal to generate a plurality of echo replica signals;
- a second adaptive filter responsive to each incoming signal other than the selected incoming signal to generate an echo replica signal from the incoming signal input thereto,
- the number of first and second adaptive filters being equal to the number of echo sources in said communication system; and
- a plurality of subtraction circuits operative to subtract said echo replica signals from each signal transmitted from said first station to said second station such that such that one of said first echo replica signals and an echo replica signal derived from each incoming signal other than said selected incoming signal are subtracted from each transmitted signal,
- said switches being operative in response to the output of said analysis circuit.

21. An echo cancelling apparatus for a multi-channel communication including a first and a second station, said apparatus comprising:
- a pre-processing circuit including:
  - a filter connected to process a selected incoming signal received at said first station from said second station and operative to generate a filtered signal; and
  - a multiplexing circuit responsive to said filtered signal and said selected incoming signals, to generate a composite signal;
- a plurality of first adaptive filters, each responsive to said composite signal to generate a first plurality of echo replica signals;
- a second adaptive filter responsive to each incoming signal other than the selected incoming signal to generate an echo replica signal derived from its incoming signal,
- the number of adaptive filters being equal to the number of echo sources in said communication system;
- a plurality of subtraction circuits operative to subtract one of said first plurality of echo replica signals and each of said echo replica signals generated by said second adaptive filters from signals being transmitted from said first station to said second station; and
- a control circuit operative to control said adaptive filters to minimize the output of said plurality of subtraction circuits.

22. The apparatus for cancelling a multi-channel echo as set forth in claim 21, wherein said multiplexing circuit comprises a switch for alternately outputting said selected incoming signal and said filtered signal.

23. The apparatus for cancelling a multi-channel echo as set forth in claim 22, wherein said filter circuit is characterized by at least one time-varying coefficient having zero and non-zero values; and
said preprocessing circuit further includes:
- a frequency divider responsive to a reference clock signal to generate a low frequency clock signal,
- said low frequency clock signal having a frequency that is lower a sampling frequency associated with said selected incoming signal and said filtered signal; and
- a control circuit responsive to said reference clock signal and said low frequency clock signal to operate said switch so as to control the change of said time-varying coefficient.

24. The apparatus for cancelling a multi-channel echo as set forth in claim 22, wherein:
said filter circuit is characterized by at least one time-varying coefficient having zero and non-zero values; and
said preprocessing circuit further includes:
- a frequency divider responsive to a reference clock signal to generate a low frequency clock signal,
- said low frequency clock signal having a frequency that is lower a sampling frequency associated with said selected incoming signal and said filtered signal;
- an analysis circuit operative to generate an output signal in response to a predetermined characteristic of said selected incoming signal; and an AND circuit responsive to coincidence said low frequency clock signal and said output of said analysis circuit to provide a control signal for operating said switch, and wherein operation of said switch controls the value of said time-varying coefficient.

25. The apparatus for cancelling a multi-channel echo as set forth in claim 22, wherein:

said filter circuit is characterized by at least one time-varying coefficient having zero and non-zero values;

said preprocessing circuit further includes an analysis circuit responsive to a predetermined property of said selected incoming signal to generate a control signal for operating said switch; and an output of said analysis circuit and reference clock signal control changes of said time-varying coefficients of said filter circuit.

26. An echo cancelling apparatus for a multi-channel communication including a first and a second station, said apparatus comprising:

a pre-processing circuit including:

a filter connected to process a selected incoming signal received at said first station from said second station and operative to generate a filtered signal; and a multiplexing circuit responsive to said filtered signal and said selected incoming signals, to generate a composite signal;

an amplitude adjustment circuit respectively operative to generate an amplitude-adjusted signal corresponding to each incoming signal other than said selected incoming signal;

a plurality of first adaptive filters, each responsive to said composite signal to generate a first plurality of echo replica signals;

a second adaptive filter responsive to each amplitude-adjusted signal to generate an echo replica signal derived from its incoming signal, the number of first and second adaptive filters being equal to the number of echo sources in said communication system;

a plurality of subtraction circuits operative to subtract one of said first plurality of echo replica signals and each of said echo replica signals generated by said second adaptive filters from signals being transmitted from said first station to said second station; and a control circuit operative to control said adaptive filters to minimize the output of said plurality of subtraction circuits.

27. The apparatus for cancelling a multi-channel echo as set forth in claim 26, wherein said filter circuit is characterized by at least one time-varying coefficient having zero and non-zero values.

28. The apparatus for cancelling a multi-channel echo as set forth in claim 27, wherein said pre-processing circuit further comprises:

a frequency divider responsive to a reference clock signal to generate a lower frequency clock signal, said low frequency clock signal having a frequency that is lower than a sampling period associated with the signals being multiplexed; and the values of said time varying coefficient are responsive to said low frequency clock signal and said reference clock signal.

29. The apparatus for cancelling a multi-channel echo as set forth in claim 27, wherein said pre-processing circuit further comprises:

a frequency divider responsive to a reference signal to generate a clock signal having a frequency that is lower than a sampling frequency associated with the signals being multiplexed;

an analysis circuit operative to generate an output signal in response to a predetermined characteristic of said selected incoming signal; and an AND circuit operative to detect coincidence of said clock signal and the output of said analysis circuit; and the output of said AND circuit and said reference signal control the value of said time-varying coefficient.

30. The apparatus for cancelling a multi-channel echo as set forth in claim 27, wherein:

said filter circuit is characterized by at least one time-varying coefficient; and said preprocessing circuit further comprises:

a reference clock generation circuit for generating the reference clock signal; and an analysis circuit operative to generate an output signal in response to a predetermined characteristic of said selected incoming signal; and wherein an output of said analysis circuit and said reference clock signal control changes of said time varying coefficients.

* * * * *